(12) United States Patent
Suzuki et al.

(10) Patent No.: US 7,744,465 B2
(45) Date of Patent: Jun. 29, 2010

(54) GAME MACHINE AND DATA STORAGE MEDIUM HAVING STORED THEREIN GAME PROGRAM

(75) Inventors: Ryunosuke Suzuki, Kyoto (JP); Yoichi Yamada, Kyoto (JP); Tomoaki Yoshinobu, Kyoto (JP); Takayuki Shimamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1444 days.

(21) Appl. No.: 10/930,910

(22) Filed: Sep. 1, 2004

(65) Prior Publication Data

US 2005/0187015 A1 Aug. 25, 2005

(30) Foreign Application Priority Data

Feb. 19, 2004 (JP) ............................. 2004-043273

(51) Int. Cl.
A63F 9/22 (2006.01)
(52) U.S. Cl. .............................. 463/32; 463/31; 463/40
(58) Field of Classification Search ............. 463/30–33; 348/14.07; 700/85; 345/19, 427, 419, 2.1, 345/591; 707/100, 104.1; 343/757; 715/739, 715/854, 709, 708, 205, 700; 702/178; 434/308; 709/203
See application file for complete search history.

(56) References Cited

U.S. PATENT DOCUMENTS 4,542,903 A * 9/1985 Yokoi et al. .................... 463/31
4,720,805 A * 1/1988 Vye ............................. 700/85
5,767,897 A * 6/1998 Howell ..................... 348/14.07
6,283,857 B1 * 9/2001 Miyamoto et al. ............ 463/31
6,540,614 B1 * 4/2003 Nishino et al. ................ 463/40
7,170,508 B2 * 1/2007 Ohno et al. .................. 345/419

FOREIGN PATENT DOCUMENTS

| JP | A-2000-317137 | 11/2000 |
| JP | A-2001-178963 | 7/2001 |
| JP | A-2002-11243 | 1/2002 |

OTHER PUBLICATIONS

SOCOM: US Navy Seals Instruction Manual, SCEA . . . see seal position.*
EverQuest Online Adventures-Screenshots-SCEA.*

(Continued)

*Primary Examiner*—Peter DungBa Vo
*Assistant Examiner*—Masud Ahmed
(74) *Attorney, Agent, or Firm*—Nixon & Vanderhye P.C.

(57) ABSTRACT

A game machine is provided with two display units, that is, a first LCD and a second LCD. On the second LCD, feature information unique to each object located in a virtual game space is displayed. When a player selects, based on information displayed on the second LCD, one of the objects provided in the virtual game space, a focus point of a virtual camera provided in the virtual game space is set so that the virtual camera is oriented to a direction of the selected object, and the state of the virtual game space captured by the virtual camera is displayed on the first LCD. With this, the virtual game space can be displayed without impairing its worldview. Also, the player can be allowed to easily specify a desired focus target in the virtual game space.

48 Claims, 32 Drawing Sheets

OTHER PUBLICATIONS

EverQuest-Wikipedia Page of Original Release date Mar. 16, 1999.*
T2 Publishing Co., Ltd. "Pokemon Snap Strategy Book" p. 7, May 14, 1999.
Enterbrain Inc. "Super Mario Sunshine Complete Strategy Guide" pp. 10-11, Oct. 11, 2002.
Office Action issued Jul. 4, 2008 in corresponding Japanese Application No. 2004-043273.
Final Fantasy Tactics Advance saisoku Koryakubon for Beginners, Japan, DigiCube Co., Ltd., Feb. 14, 2003, First edition, p. 44 to 45, 53 w/ partial English-language translation.
Kapukon Kanpeki Koryaku shirizu 23 Biohazard Zero Perfect Capture Guide, Japan, Capcom Co., Ltd., Jan. 10, 2003, p. 14 to 15 w/ partial English-language translation.

* cited by examiner

GAME MACHINE AND DATA STORAGE MEDIUM HAVING STORED THEREIN GAME PROGRAM

FIELD OF THE INVENTION

The illustrative embodiments relate to game machines and game programs and, specifically, to a game machine and a game program causing a game to proceed as a focus target is determined in accordance with an operation of a player.

BACKGROUND AND SUMMARY OF THE INVENTION

Description of the Background Art

In some conventionally-available game machines, the motion of an object selected from a plurality of objects that are present in a virtual game space is controlled in accordance with an operation of the player.

Japanese Patent Laid-Open Publication No. 2000-317137 (hereinafter referred to as a first patent document) discloses a technology in which, in a soccer game to be played in a game machine, a mark is displayed under the feet of a soccer-player character selected by a game player, thereby making it easy for the game player to identify the soccer-player character currently selected. Also, in this soccer game, the name of the currently-selected soccer-player character is also displayed on a game screen.

Japanese Patent Laid-Open Publication No. 2002-11243 (hereinafter referred to as a second patent document) discloses a game machine in which a player can play a game by switching among a plurality of characters. According to the game machine, a portrait of the selected character is displayed in a lower area on a game screen, and the names of unselected characters are displayed.

Japanese Patent Laid-Open Publication No. 2001-178963 (hereinafter referred to as a third patent document) discloses a game machine in which one object is selected from a plurality of objects displayed on a game screen, and then a focus point of a virtual camera is set at the selected object.

Also, there is another conventional game machine in which a game proceeds as a focus point is determined in accordance to each operation of a player.

For example, "Pokemon Snap Strategy Book" published by T2 Publishing Co., Ltd. on May 14, 1999 (hereinafter referred to as a first non-patent document) discloses, on page 7, a game machine that allows a player to take a photograph of a monster. According to this game machine, a virtual vehicle moves through an automatic operation in a virtual game space and, in accordance with the movement, a view point (a position of a virtual camera) moves. The player moves a focus point of the virtual camera by using an analog control stick, and then takes a photograph by using a shutter operation button.

Furthermore, "Super Mario Sunshine Complete Strategy Guide" published by Enterbrain Inc. on Oct. 11, 2002 (hereinafter referred to as a second non-patent document) discloses, on pages 10 and 11, a game machine in which a 3D-displayed player character in a virtual game space is moved and operated. According to this game machine, when the player moves the player character in the virtual game space by using an analog control stick, a view point moves accordingly. Also, by using another analog control stick, the player can move the focus point of the virtual camera.

Here, in the game machine disclosed in the first patent document, a mark is displayed so as to overlap with the image of the virtual game space in order to identify the selected player character. This might disadvantageously make the image of the virtual game space difficult to view, in some cases. Moreover, such a display of the subject (mark) which actually does not exist in the virtual game space is a factor that inhibits the player from enthusiastic game play in the virtual game space. Still further, in this game machine, the name of the currently-selected player character is also displayed. However, merely displaying the name is not enough to identify which player has been currently selected on the game screen, and therefore requires a display of the above-described mark or the like, which has the disadvantages as described above.

In the game machine disclosed in the second patent document, the character that is the selected character is indicated only by information displayed in a lower area on the game screen. This makes it difficult to understand which character is selected in the game space. Moreover, in the game machines disclosed in the first and second patent documents, the selected object is not necessarily displayed at a position which is easy to view.

Furthermore, in the game machine disclosed in the third patent document, in order to identify the currently-selected object, the focus point in the image representing the virtual game space has to be determined, which might be very difficult, particularly when a plurality of objects are present in a small area in the virtual game space. Also, in this game machine, the selected object is switched to another by using a cross key (paragraph [0039] in the third patent document). In order to do this, a cursor to be moved and displayed in accordance with the operation of the cross key has to be displayed so as to overlap with the image of the virtual game space. This might disadvantageously make the image of the virtual game space difficult to view, in some cases. Moreover, such a display of the subject (cursor) which actually does not exist in the virtual game space is a factor that inhibits the player from enthusiastic game play in the virtual game space.

Still further, in the game machine disclosed in the first non-patent document, the focus point is moved with the analog stick. Therefore, instantaneously changing the focus point is difficult. Moreover, without a map display function, the current position of the player is difficult to ascertain.

Still further, in the game machine disclosed in the second non-patent document, the view point and the focus point are moved by using a plurality of analog sticks, thereby making the operation complex and inhibiting an instantaneous move of the focus point. Moreover, without a map display function, the current position of the player character is difficult to ascertain.

Therefore, a feature of the illustrative embodiments is to provide a game machine in which an arbitrary focus target is selected in a virtual game space, the game machine capable of presenting a current focus target to the player without impairing an image of the virtual game space.

Another feature of the illustrative embodiments is to provide a game machine in which an arbitrary focus target is selected in a virtual game space, the game machine being capable of displaying a guide for changing the focus target without impairing an image of the virtual game space.

Another feature of the illustrative embodiments is to provide a game machine in which an arbitrary focus target is selected in a virtual game space, the game machine allowing the user to easily specify the focus target.

An illustrative embodiment adopts the following structure to achieve at least one of the objects mentioned above. Note that reference characters and numerals in parentheses below merely show examples of correspondence with the embodiments described further below for the sake of better understanding of the present invention, and do not restrict the scope of the present invention.

A first aspect of an illustrative embodiment is directed to a game machine provided with a first display unit (11, 11a, 11c) and a second display unit (12, 11b) to cause a game to proceed in a virtual game space. The game machine includes: an input unit (15, 16) to be operated by a player; a first display control means (31, 35, 38, S72, S93) which generates a first image representing a scene captured by a virtual camera provided in the virtual game space and which causes the first image to be displayed on the first display unit; a second display control means (31, 36, 39, S73, S92) which generates a second image for allowing the player to specify a desired focus target in a virtual game space and which causes the second image to be displayed on the second display unit; a focus target determining means (31, S66, S68, S96) which determines the focus target based on an input from the input unit; and a virtual camera control means (31, S71, S96) which directs the virtual camera to the focus target determined by the focus target determining means. Note that the virtual camera control means may control a plurality of virtual cameras.

According to a second aspect based on the first aspect, a plurality of objects are present in the virtual game space. The game machine further includes feature information storage means (37, 70) which stores feature information (FIG. 4) unique to each of the plurality of objects. Based on an operation (pressing the right or left portion of the cross key) performed by a player on the input unit, the focus target determining means determines one of the plurality of objects as a focus target object. The second display control means generates the second image, including the feature information corresponding to the focus target object. The virtual camera control means sets a focus point of the virtual camera at the focus target object. Note that the feature information storage means may have stored therein the feature information in advance, or may temporarily store the feature information generated in the course of the game process.

According to a third aspect based on the second aspect, the first display control means generates the first image from which an image for distinguishing the focus target object from other objects is excluded.

According to a fourth aspect based on the second aspect, the game machine further includes a feature information selecting means (31), which selects one piece of the feature information of the plurality of objects as selected feature information, in accordance with an operation performed by the player on the input unit. The focus target determining means determines an object corresponding to the selected feature information as the focus target object. The second display control means generates the second image including an image (FIGS. 4 and 16) for distinguishing the selected feature information from other pieces of feature information.

According to a fifth aspect based on the second aspect, the second display control means generates the second image including at least one command for changing the objects (FIG. 4). The game machine further includes: a command selecting means (31, S35, S39, S46) which selects one of the commands in accordance with an operation (pressing the upper or lower portion of the cross key) performed by the player on the input unit; and an object changing means (31, S36, S42, S48) which changes the focus target object according to the selected command.

According to a sixth aspect based on the fifth aspect, the game machine further includes: a state storage means (37, 70, heat-up flag) which stores a state of the focus target object; and a state changing means (31, S41) which changes the state of the focus target object. Whether the command is selectable depends on a current state of the focus target object. The second display control means generates the second image, which allows the player to ascertain which command is currently selectable (FIG. 15, gray out).

According to a seventh aspect based on the second aspect, the game machine further includes: a state storage means which stores a state of the focus target object; and a state changing means which changes the state of the focus target object. The second display control means generates the second image, including information (FIG. 4, current-state information) indicative of a current state of the focus target object.

According to an eighth aspect based on the second aspect, the virtual camera control means changes either one of a position of the virtual camera and a zoom scaling in accordance with an operation performed by the player on the input unit, or when a game state enters a predetermined state (S51, S53), and sets a focus point of the virtual camera to the focus target object irrespective of the change.

According to a ninth aspect based on the second aspect, the game machine further includes a portrait image generating means (31, S16, S37, S43), which generates a portrait image of the objects through rendering. The second display control means generates the second image including the portrait image as the feature information (FIG. 4).

According to a tenth aspect based on the first aspect, the virtual game space is a three-dimensional virtual game space. The second display control means generates the second image, including a two-dimensional map (bird's-eye map) corresponding to the virtual game space. The game machine further includes a coordinate detecting means which detects, based on an input from the input unit (16), coordinates indicative of a position (CP) specified by the player on the second display unit. Based on the coordinates detected by the coordinate detecting means, the focus target determining means determines a point in the virtual game space, corresponding to the position specified by the player on the second display unit as a focus target point (SP). The virtual camera control means sets the focus point of the virtual camera at the focus target point.

According to an eleventh aspect based on the tenth aspect, the game machine further includes a distance calculating means (31), which calculates a distance (D) from a position of the virtual camera to the focus target point in the virtual game space. The virtual camera control means sets an angle of view of the virtual camera so that the angle of view is decreased as the distance calculated by the distance calculating means is longer (FIGS. 26A, 26B).

According to a twelfth aspect based on the eleventh aspect, the virtual camera control means sets a vertical angle of an isosceles triangle as the angle of view of the virtual camera, the isosceles triangle having a base of a fixed length and a height being changed in proportion to the distance (D) calculated by the distance calculating means (FIGS. 26A, 26B).

According to a thirteenth aspect based on the tenth aspect, the focus target determining means determines two of the three coordinates for specifying a position of the focus target point, based on the coordinated detected by the coordinate detecting means (in FIG. 25, XW=WM, YW=YM) and another one of the coordinates based on a predetermined rule (in FIG. 25, ZW=α (predetermined value)).

According to a fourteenth aspect based on the tenth aspect, the virtual camera control means moves a position of the virtual camera in accordance with an operation performed by the player on the input unit or in an automatic manner. The second display control means generates the second image, having displayed therein an area in a predetermined range on the two-dimensional map, which corresponds to an entirety of the virtual game space, with reference to a point corresponding to the position of the virtual camera ((a) through (e) in FIG. 24).

According to a fifteenth aspect based on the tenth aspect, the second display control means generates the second image by rotating the two-dimensional map so that, on the second display unit, a direction connecting a point on the two-dimensional map corresponding to a position of the virtual camera and a point on the two-dimensional map corresponding to the focus target point is a predetermined direction on the second display unit (((a)→(b) in FIG. 27).

According to a sixteenth aspect based on the tenth aspect, the first display unit and the second display unit are relatively fixed in position. The second display control means generates the second image by rotating the two-dimensional map so that, on the second display unit, a direction connecting a point on the two-dimensional map corresponding to the focus target point, and a point on the two-dimensional map corresponding to a position of the virtual camera, is perpendicular to a horizontal direction of the virtual camera in the first display unit ((a)→(b) in FIG. 27). Here, the horizontal direction of the virtual camera means an X axis direction in camera coordinates when each axis of the camera coordinates are generally set (an X axis is set in a horizontal direction, a Y axis is set in a vertical direction, and a Z axis is set in a depth direction). At this time, the Y axis direction of the camera coordinates may be set so as not to be changed. Also, in place of the horizontal direction of the virtual camera, the above-described direction may be perpendicular to a horizontal direction in screen coordinates of the second display unit.

According to a seventeenth aspect based on the tenth aspect, the second display unit is shaped as a rectangle. The second display control means generates the second image by rotating the two-dimensional map so that, on the second display unit, a direction connecting a point on the two-dimensional map corresponding to the focus target point and a point on the two-dimensional map corresponding to a position of the virtual camera coincides with a direction of a vertical side of the rectangle of the second display unit ((a)→(b) in FIG. 27).

According to an eighteenth aspect based on the tenth aspect, the second display control means generates the second image by zooming in or out of the two-dimensional map so that a distance on the second display unit between a point on the two-dimensional map corresponding to the focus target point and a point on the two-dimensional map corresponding to a position of the virtual camera is a predetermined distance ((b)→(c) in FIG. 27).

According to a nineteenth aspect based on the tenth aspect, the game machine further includes: a photographic object control means (31, 79, S81) which disposes a photographic object (monster) moving in the virtual game space with a predetermined algorithm; an evaluation target image storage means (31, 93, S89) which stores the first image generated by the first display control means as an evaluation target image in accordance with a specific operation (pressing the A button) performed by the player on the input unit; and an evaluating means (31, S90) which evaluates the evaluation target image based on a state of disposition of the photographic object in the evaluation target image.

According to a twentieth aspect based on the tenth aspect, as the input unit, at least a touch panel is provided on the second display unit.

A twenty-first aspect of an illustrative embodiment is directed to a computer-readable storage medium having stored therein a game program for causing a computer (31, 37) connected to a first display unit (11, 11a, 11c), a second display unit (12, 11b), and an input unit (15, 16) to be operated by a player to proceed a game in a virtual game space. The game program causes the computer to function as: a first display control means (S72, S93) which generates a first image, representing a scene captured by a virtual camera, provided in the virtual game space, and causes the first image to be displayed on the first display unit; a second display control means (S73, S92) which generates a second image for allowing the player to specify a desired focus target in a virtual game space, and which causes the second image to be displayed on the second display unit; a focus target determining means (S66, S68, S96) which determines the focus target based on an input from the input unit; and a virtual camera control means (S71, S96) which directs the virtual camera to the focus target determined by the focus target determining means.

According to the first aspect, the first image generated by setting the focus target selected by the player as a focus point of the virtual camera is displayed on the first display unit. Paying attention to the selected target is consistent with human behavior in the real world. By viewing the first display unit, the player can view the current focus target. Also, the information for allowing the player to specify the focus target is displayed on the second display unit. While viewing this second display unit, the player can select a desired focus target. Therefore, no special image indicative of a state of selection or no special image for selection of a desired focus target has to be displayed on the first display unit displaying the virtual game space. This can prevent the virtual game space from being difficult to view, and also can prevent the world view of the virtual game space from being impaired.

According to the second aspect, by viewing the second image displayed on the second display unit, the player can easily specify the current focus target object. Therefore, on the first display unit, no special image (marked image) for distinguishing the focus target object from other objects does has to be displayed on the periphery of the focus target object. This achieves the following effects:

(1) This prevents a part of the virtual game space from being hidden behind the marked image;

(2) When a marked image is displayed, the object provided with the marked image stands out among the objects, thereby making it clear that the object is the selected object. However, that object may be too conspicuous in the image representing the virtual game space. Moreover, the marked image is merely a functional image and not an image representing an object in the virtual game space, thereby impairing the worldview of the virtual game space. According to the present aspect, a marked image does not have to be displayed on the first display unit, thereby achieving a natural image representing the virtual game space.

Also, on the first display unit, instead of a marked image, the first image, generated by setting the focus target object selected by the player as the target point of the virtual camera, is displayed. Paying attention to the selected object is consistent with human behavior in the real world. By viewing the first display unit, the player can naturally and intuitively determine which object is the current focus target object.

Furthermore, the feature information of the focus target object is displayed on the second display unit. Therefore, with reference to the information disclosed in the second display unit, the player can easily determine which object is the currently selected object.

As described above, according to the second aspect, the player can switch among the objects without impairing the image representing the virtual game space or the world view of the virtual game space to naturally ascertain which object is the selected object, thereby observing the selected object at least on the first display unit.

According to the third aspect, no mark image is displayed on the first display unit. Therefore, the worldview of the virtual game space is not impaired.

According to the fourth aspect, the player selects the feature information while viewing the second display unit, thereby indirectly selecting an object. Therefore, on the first display unit displaying the virtual game space, an additional image, such as a marked image, does not have to be displayed. This makes it possible to display a natural image representing the virtual game space, and to maintain the worldview of the virtual game space.

According to the fifth aspect, the selection guide image for guiding the player through an operation scheme for changing the focus target object is displayed not on the first display unit, but on the second display unit. Therefore, on the first display unit displaying the virtual game space, an additional image, such as a marked image, does not have to be displayed. This makes it possible to display a natural image representing the virtual game space, and to maintain the worldview of the virtual game space.

Furthermore, according to the fifth aspect, the focus target object can be changed with an operation from the player. Therefore, in addition to observing the object, the player can also proactively participate in the virtual game space. Also, on the second display unit, the feature information of the focus target object is displayed together with commands. Thus, it is easy to recognize the object on which these commands have an influence.

According to the sixth aspect, selectable commands are changes in accordance with a change in the state of the focus target object. On the second display unit, commands are displayed so that the user can distinguish between currently-selectable commands and currently-unselectable commands. Therefore, the player can effectively select an appropriate command in accordance with the situation.

According to the seventh aspect, the information regarding the current state of the focus target object is displayed on the second display unit. Therefore, the player can ascertain the state of the focus target object by viewing the second display unit. For example, even if the focus target object is hidden behind other objects and therefore the state of the focus target object is difficult to ascertain, the player can ascertain the state of the focus target object by viewing the second display unit.

According to the eighth aspect, with the focus point fixed with respect to the focus target object, the position of the virtual camera or the zoom is changed. Therefore, an image, representing the object viewed from an arbitrary direction, can be displayed on the first display unit, thereby increasing an entertainment aspect of the game. Also, the player can observe the focus target object from different directions.

According to the ninth aspect, data (polygon data and texture data) for displaying objects on the first display unit is used to generate a portrait image for display on the second display unit. Therefore, a correspondence between the objects displayed on the first display unit and the feature information displayed on the second display unit can be easily understood. Also, the player can easily ascertain which object, among the objects displayed on the first display unit, is the focus target object.

According to the tenth aspect, the focus point of the virtual camera can be easily and promptly changed to an arbitrary point. Also, with the two-dimensional map displayed on the second display unit, the player can always ascertain the state of the surroundings of the view point (virtual camera) in the virtual game space, thereby achieving intuitive, stress-free game play.

According to the eleventh aspect, the angle of view is determined based on the coordinates detected by the coordinate detecting means. Therefore, the player can determine the direction of the line of sight and the zoomed screen at an appropriate angle of view with one action. If the distance from the virtual camera to the focus target point is long, the angle of view is decreased (that is, the image becomes zoomed in). Therefore, the player can ascertain the state of the surroundings of the desired focus target point in detail.

According to the twelfth aspect, with appropriate zooming, the state of the focus target point specified by the player is displayed on the first display unit at an appropriate scaling. Therefore, the player can appropriately ascertain the game space information near the desired point.

According to the thirteenth aspect, the player can determine the coordinates of the focus target point in the virtual game space only by specifying a point on the two-dimensional map. Therefore, the player can easily specify the focus target point.

According to the fourteenth aspect, by moving the position of the virtual camera (view point) in the virtual game space, images of various places in the virtual game space can be displayed. Also, the focus target point can be determined with reference to the position of the virtual camera. Therefore, with reference to the game image displayed on the first display unit, the focus target point can be easily determined.

According to the fifteenth aspect, the two-dimensional map is displayed so that the direction of the line of sight (the direction connecting the point on the two-dimensional map corresponding to the position of the virtual camera and the point thereon corresponding to focus target point) is oriented to a predetermined direction on the second display unit. Therefore, a position on the second display unit always corresponds to a specific direction, thereby making it easy for the player to change the current direction of the line of sight to another direction.

According to the sixteenth aspect, the direction of the line of sight on the second display unit is perpendicular to the horizontal direction of the virtual camera in the first display unit. Therefore, the horizontal direction of the virtual camera on the second display unit coincides with the horizontal direction of the virtual camera on the first display unit. Therefore, the player can intuitively ascertain the correspondence with the two-dimensional map displayed on the second display unit and the virtual game space displayed on the first display unit, and therefore can easily determine the direction of the line of sight. For example, when the player desires to view a portion in the left direction of the virtual game space displayed on the first display unit, the player simply specifies the left-half area of the second display unit even without viewing the two-dimensional map displayed on the second display unit, thereby moving the direction of the line of sight to the left. This improves operability.

According to the seventeenth aspect, the direction of the line of sight on the first display unit coincides with the direction of the vertical side of the rectangular screen of the first display unit (normally, coincides with the direction of a player's eye sight at the time of game play). Therefore, the player can intuitively specify the direction of the line of sight. This seventeenth aspect achieves an effect similar to that of the sixteenth aspect.

According to the eighteenth aspect, irrespectively of the distance from the view point to the focus target point, the information of the virtual game space at least from the view point to the focus target point can be reliably presented to the player. In particular, when the view point and the focus target point are distanced apart from each other, the two-dimensional map is zoomed out for display. Thus, by viewing the second display unit, the player can ascertain the state of the surroundings of the view point and the focus target point. Also, when the view point and the focus target point are close to each other, the two-dimensional map is zoomed in for display. Thus, even when the view point and the focus target point are close to each other, the player can finely adjust the focus target point appropriately.

According to the nineteenth aspect, a photograph-taking game with high operability can be provided.

According to the twentieth aspect, the player touches a desired point on the two-dimensional map displayed on the second display unit, thereby easily specifying a target point.

These and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, embodiments of the present invention are described below.

First Embodiment

Figure 1:
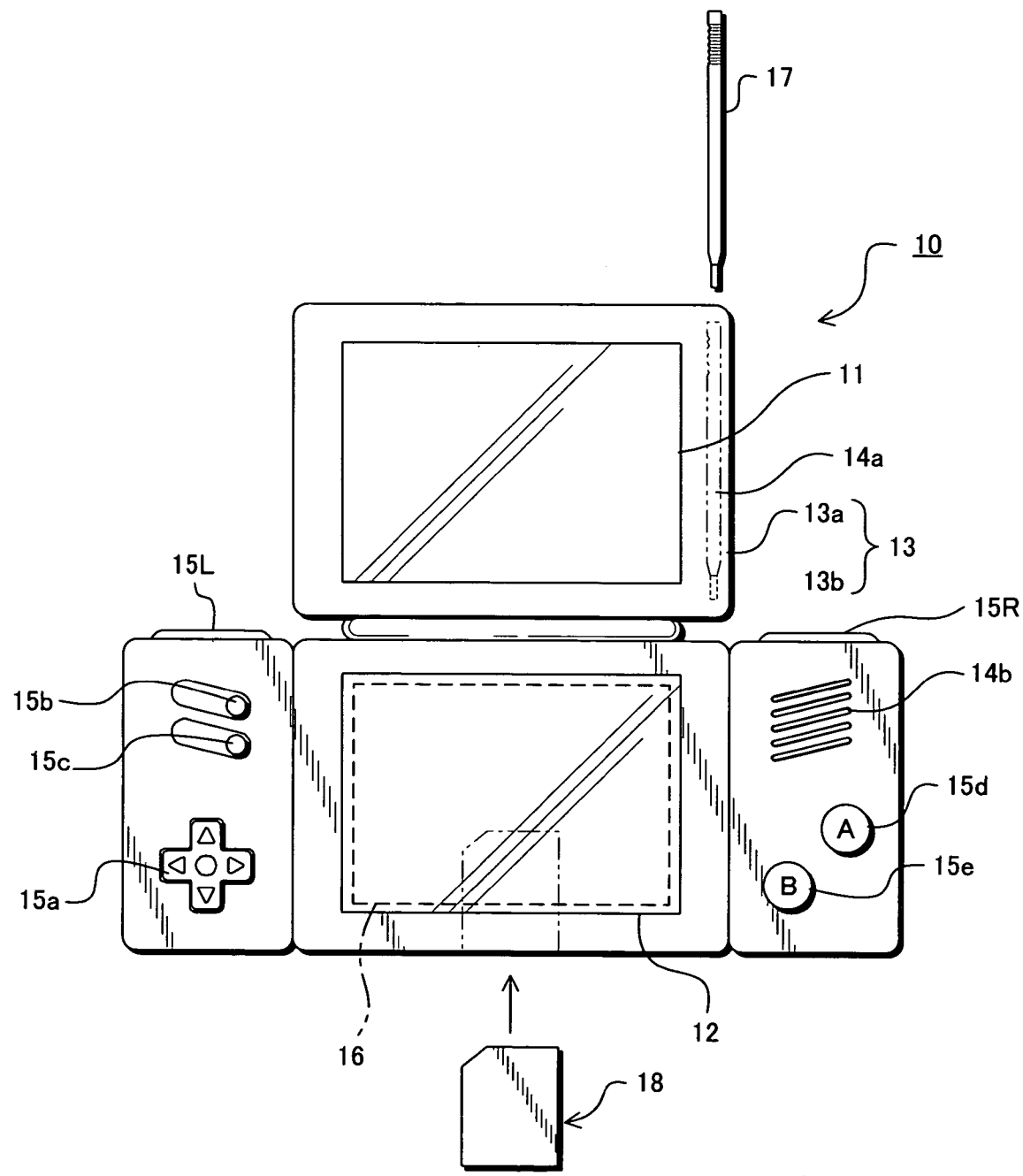
FIG. 1 is an external view of a game machine according to embodiments of the present invention.

FIG. 1 is an external view of a game machine according to a first embodiment of the present invention. In FIG. 1, a game machine 10 according to the present embodiment is a portable game machine configured to be accommodated in a housing 13 so that two liquid crystal display units (hereinafter referred to as LCDs) 11 and 12 are disposed at predetermined positions. Specifically, when the first LCD 11 and the second LCD 12 are vertically disposed for accommodation, the housing 13 is formed by an upper housing 13a and a lower housing 13b, with the upper housing 13a being rotatably supported by a part of the upper side of the lower housing 13b. The upper housing 13a has a flat shape slightly larger than that of the first LCD 11, and has an opening formed so that the display surface of the first LCD 11 is exposed from one main surface of the upper housing 13a. The lower housing 13b has a flat shape horizontally longer than that of the upper housing 13a, and has an opening formed so that the display surface of the second LCD 12 is exposed approximately at the center portion in the horizontal direction. Also, either one of the portions sandwiching the second LCD 12 is formed with sound holes 14b, and both portions are formed with components of an operation switch unit 15.

The operation switch unit 15 includes a direction instruction switch 15a, a start switch 15b, and a select switch 15c mounted on one main surface of the lower housing 13b at the left of the second LCD 12; operation switches 15d and 15e mounted thereon at the right of the second LCD 12, and side switches 15L and 15R mounted on an upper surface (upper side surface) of the lower housing 13b. The direction instruction switch 15a is used for instruction of a moving direction of a player object (or a player character) operable by the player, and for instruction of a moving direction of the cursor, for example. The operation switches 15d and 15e are used for input for instruction of, for example, jumping, punching, moving a shield, or the like in an action game; or, for example, getting an item, selecting and determining a command, or the like in a role playing game (RPG) or a simulation RPG. Also, as required, an additional operation may be further added.

The second LCD 12 is provided on its upper surface with a touch panel 16. The touch panel 16 is of anyone of a resistive-film type, an optical (infrared) type, or a capacitive type, for example, for detecting a coordinate position at which a stick 17 (or a finger, etc.) makes contact when a pressing operation or a moving operation is performed on the touch panel 16 with the stick 17.

As required, an accommodation slit 14a for accommodating the stick 17 can be formed at a position near a side surface of the upper housing 13a. At a part of a side surface of the lower hosing 13b, a cartridge insertion portion (not shown) is formed for removably inserting a game cartridge 18 having incorporated therein a game program. Inside the cartridge insertion portion, a connector (not shown) is incorporated for electrical connection with the game cartridge 18. Furthermore, the lower housing 13b (or the upper housing 13a) accommodates an electric circuit board (denoted as 30 in FIG. 2 described further below) having mounted thereon various electronic components, such as a CPU. Here, an information storage medium for storing a game program is not restricted to a non-volatile semiconductor memory, such as a ROM or a flash memory, but may be a CD-ROM, a DVD, an optical disc-like storage medium of a similar type. In the present embodiment, the game program is supplied from the game cartridge 18 to the game machine 10. The present invention is not restricted to the above. Alternatively, the game program may be incorporated in advance in the game machine 10. Still alternatively, the game program may be externally supplied, via a communication circuit, to the game machine 10.

Figure 2:
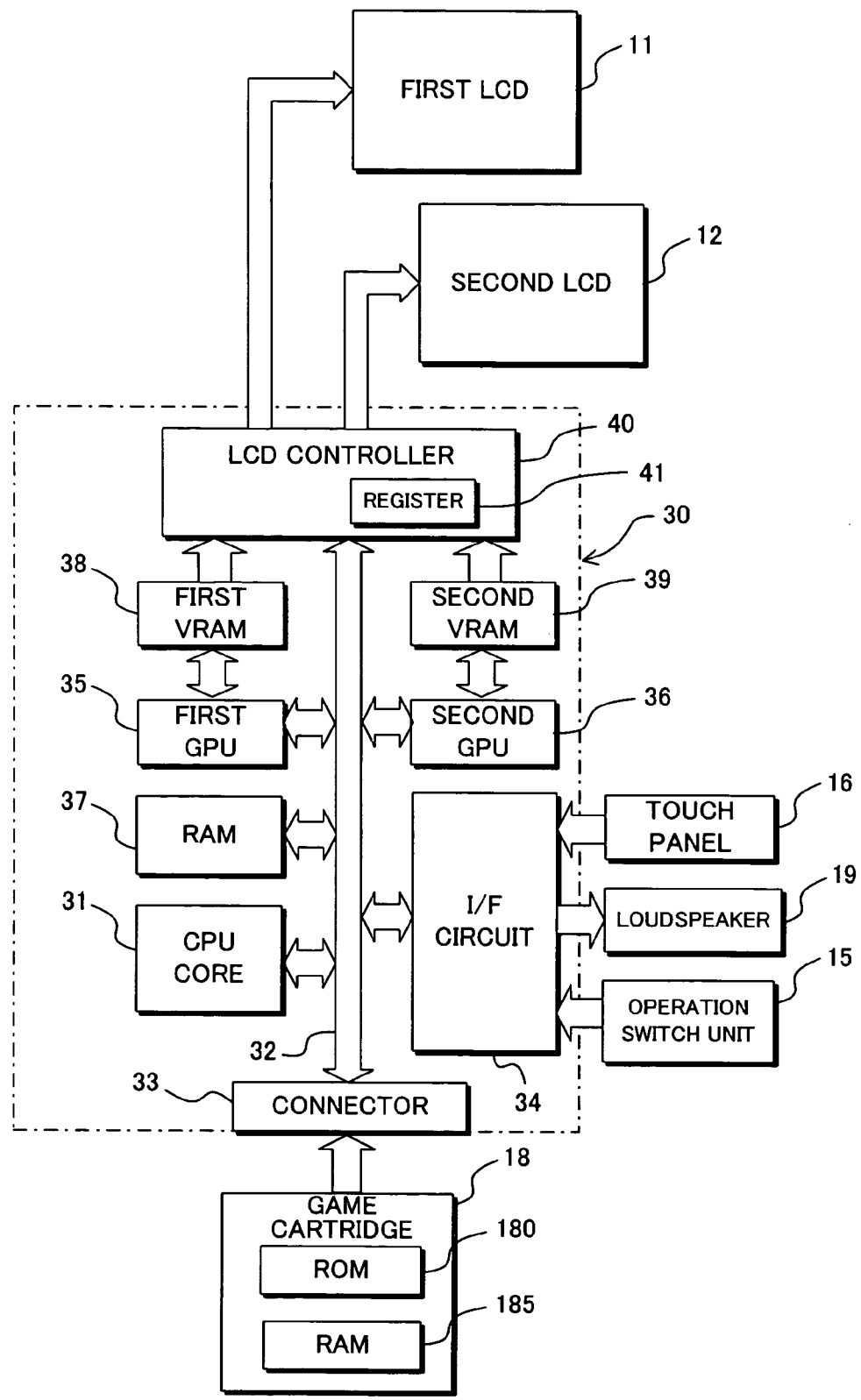
FIG. 2 is a block diagram showing a game machine 10.
Figure 10:
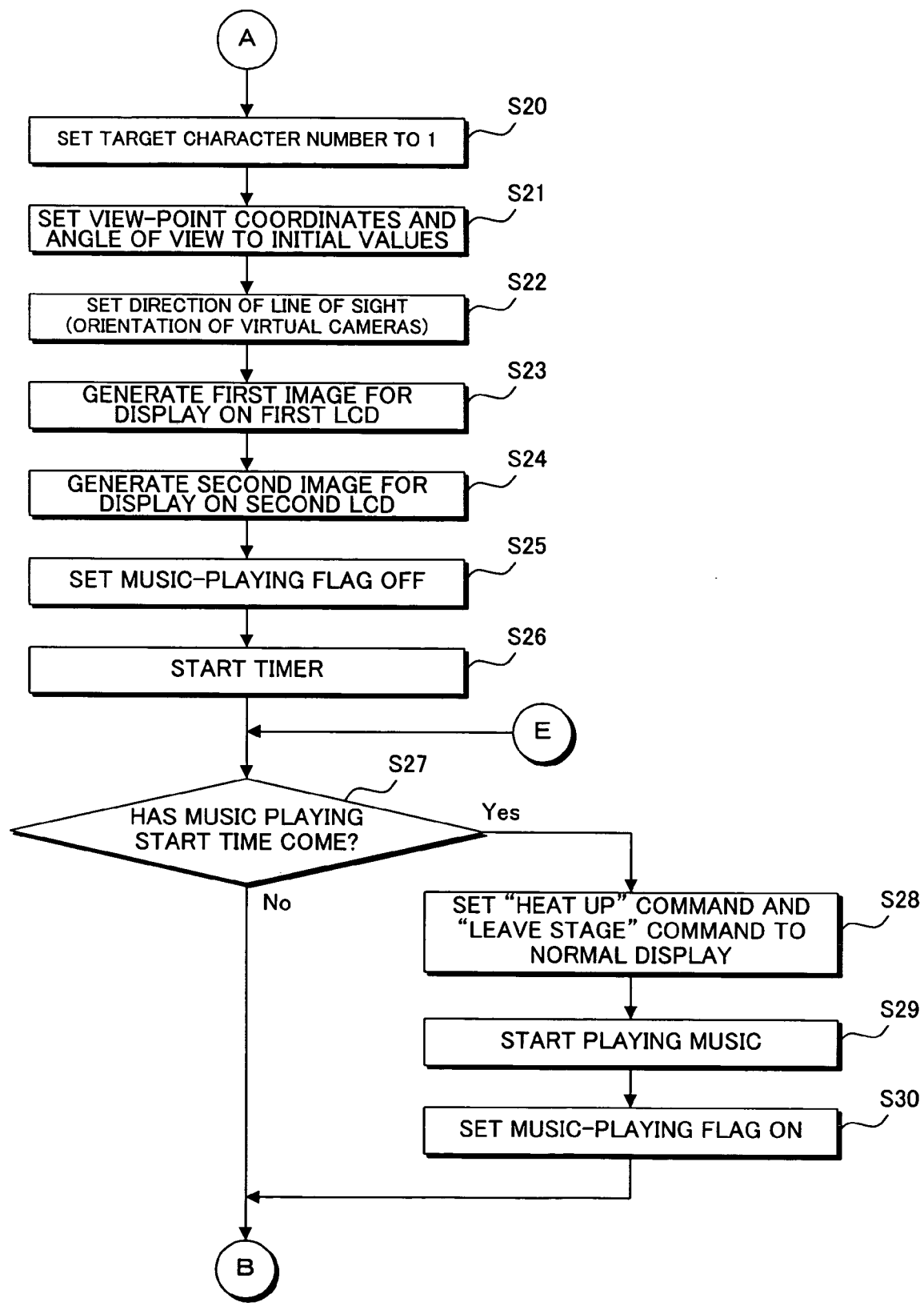
FIG. 10 is another part of the flowchart showing the flow of the game process.

FIG. 2 is a block diagram showing a game machine 10. In FIG. 10, a CPU core 31 is mounted on the electronic circuit board 30 accommodated in the housing 13. The CPU core 31 is connected via a bus 32 to a connector 33, an input/output interface (I/F) circuit 34, a first graphic processing unit (first GPU) 35 a second graphic processing unit (second GPU) 36, a RAM 37, and an LCD controller 40. The game cartridge 18 is removably connected to the connector 33. The game cartridge 18 is a storage medium for storing a game program, and specifically includes a ROM 180 for storing a game program and a RAM for rewritably storing backup data. The game program stored in the ROM 180 of the game cartridge 18 is loaded to the RAM 37, and is then executed by the CPU core 31. Temporary data obtained by the CPU core 31 executing the game program and data for generating images are stored in the RAM 37. The I/F circuit 34 is connected to the operation switch unit 15, the touch panel 16, and a loudspeaker 19, which is disposed inside the sound holes 14b.

The first GPU 35 is connected to a first video RAM (first VRAM) 38, while the second GPU 36 is connected to a second video RAM (second VRAM) 39. In response to an instruction from the CPU core 31, the first GPU 35 generates a first game image based on data stored in the RAM 37 for generating images, and then renders (stores) the generated game images in the first VRAM 38. In response to an instruction from the CPU core 31, the second GPU 36 generates a second game image based on the data stored in the RAM 37 for generating images, and then renders (stores) the generated game images in the second VRAM 39. The first VRAM 38 and the second VRAM 39 are connected to the LCD controller 40.

The LCD controller 40 includes a register 41. In response to an instruction from the CPU core 31, the register 41 stores a value of 0 or 1. When the value of the register 41 is 0, the LCD controller 40 outputs the game image rendered in the first VRAM 38 to the first LCD 11 and the game image rendered in the second VRAM 39 to the second LCD 12. Also, when the value of the register 41 is 1, the LCD controller 40 outputs the game image rendered in the first VRAM 38 to the second LCD 12 and the game image rendered in the second VRAM 39 to the first LCD 11.

The I/F circuit 34 is a circuit for transmission and reception of data between external input/output units, such as the operations witch unit 15, the touch panel 16, and the loudspeaker 19, and the CPU core 31. The touch panel 16 (including a device driver for the touch panel) has a coordinate system corresponding to a coordinate system of the second VRAM 39, and outputs data of coordinates corresponding to a position input (designated) with the stick 17. In the present embodiment, it is assumed that the resolution of the display screen of the second LCD 12 is 256 dots×192 dots, and the detection accuracy of the touch panel 16 is also 256 dots×192 dots corresponding to the display screen of the second LCD 12. Alternatively, the detection accuracy of the touch panel may be lower or higher than the resolution of the display screen of the second LCD 12.

Hereinafter, a flow of a game process to be performed by the present game machine 10 is described with reference to specific examples of a display screen. Note that, in the following, the direction instruction switch 15a is simply referred to as a cross key. Similarly, the operation switch 15d is referred to as an A button, the operation switch 15e is referred to as a B button, a side switch 15L is referred to as an L button, and the side switch 15R is referred to as an R button.

Figure 3:
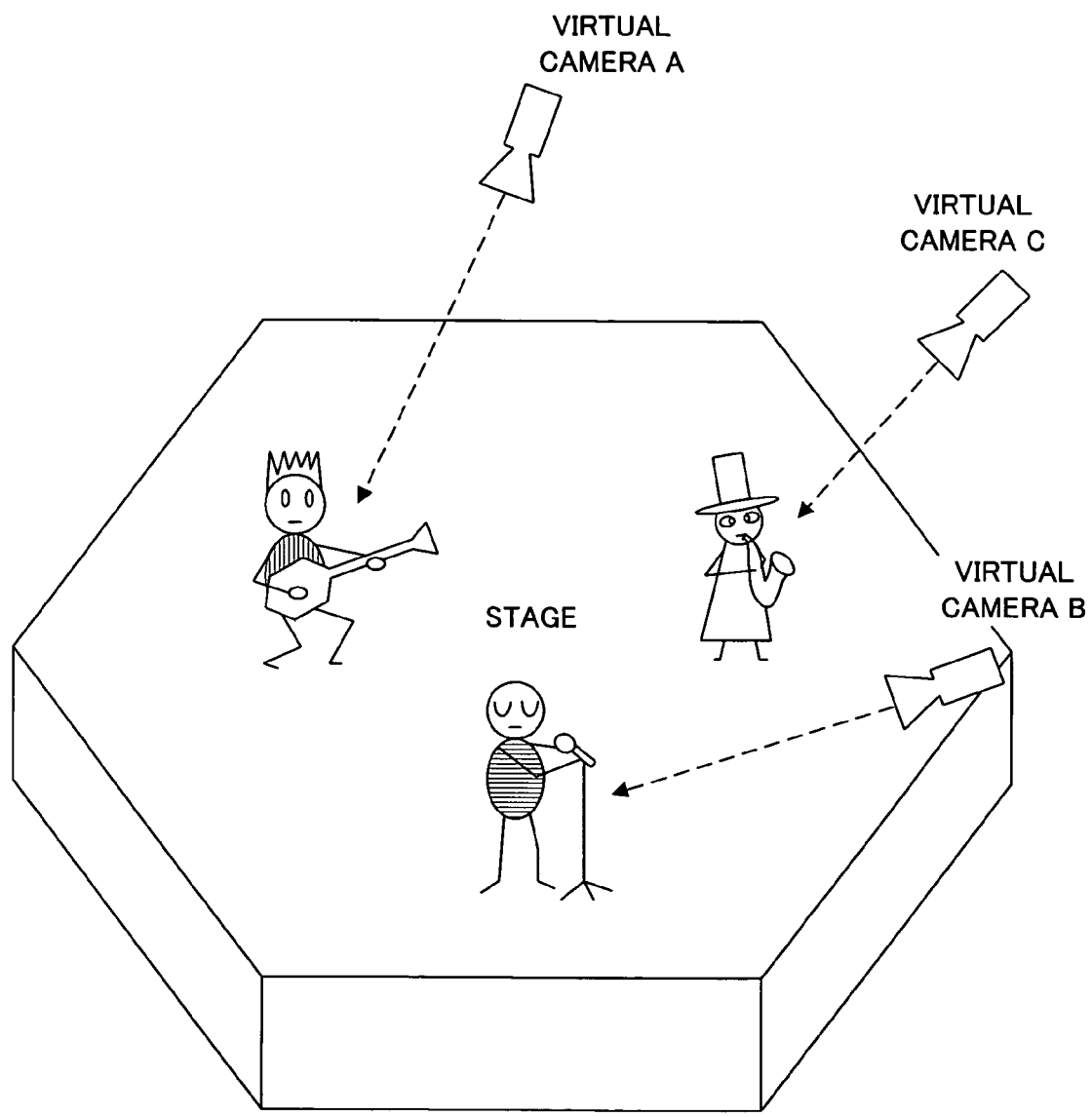
FIG. 3 is an illustration showing an example of a virtual game space in a first embodiment.

FIG. 3 is an illustration showing an example of a virtual game space in the present embodiment. In the virtual game space, a stage is provided, on which a plurality of characters are singing or playing musical instruments. Also, the virtual game space is provided with a plurality of virtual cameras (virtual cameras A, B, and C) corresponding to the respective characters.

Figure 4:
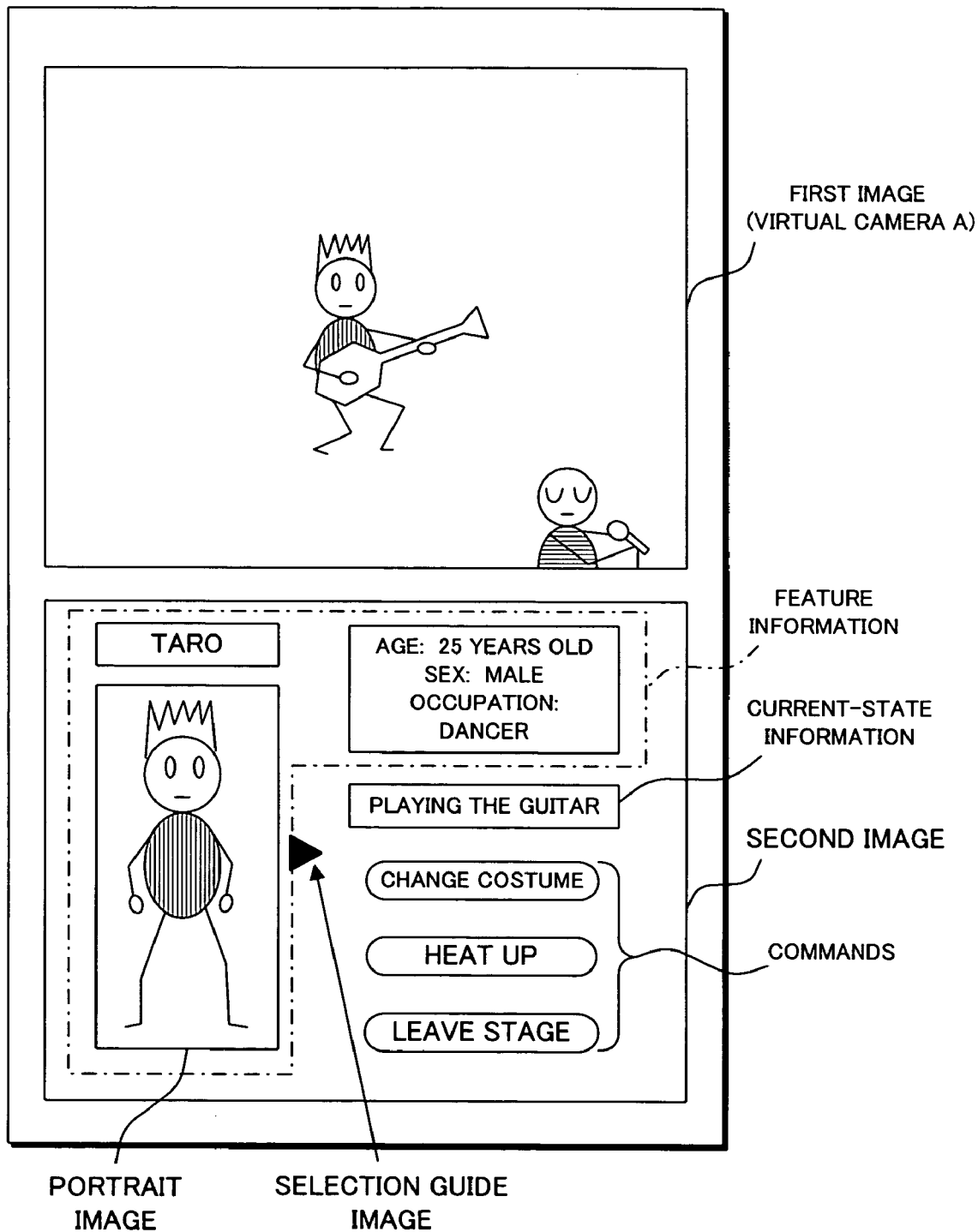
FIG. 4 is an illustration showing an example of a first image and a second image while the game is being played.

FIG. 4 is an illustration showing an example of the first image displayed on the first LCD 11 and the second image displayed on the second LCD 12 while the game is being played. In the present embodiment, the player operates the cross key to select one of the characters as a target character. On the first LCD 11, the first image captured by the virtual camera (in the example of FIG. 4, the camera A) corresponding to the target character selected by the player is displayed.

On the second LCD 12, the second image includes a variety of information as shown in FIG. 4.

In FIG. 4, feature information is information for distinguishing among the plurality of characters, including, for example, character's name, age, sex, occupation, and image (hereinafter referred to as a portrait image). On the second LCD 12, feature information of the current target character is displayed. The player can clearly ascertain which character is the target character by viewing the feature information displayed on the second LCD 12. For example, even when only the back of the target character is displayed on the first LCD 11 or when the target character is hidden behind other objects, the player can clearly ascertain which is the target character. Alternatively, feature information of other characters currently not selected as target characters may also be displayed on the second LCD in a manner such that the feature information of the target character and the feature information of the other characters can be distinguished from each other.

Figure 5:
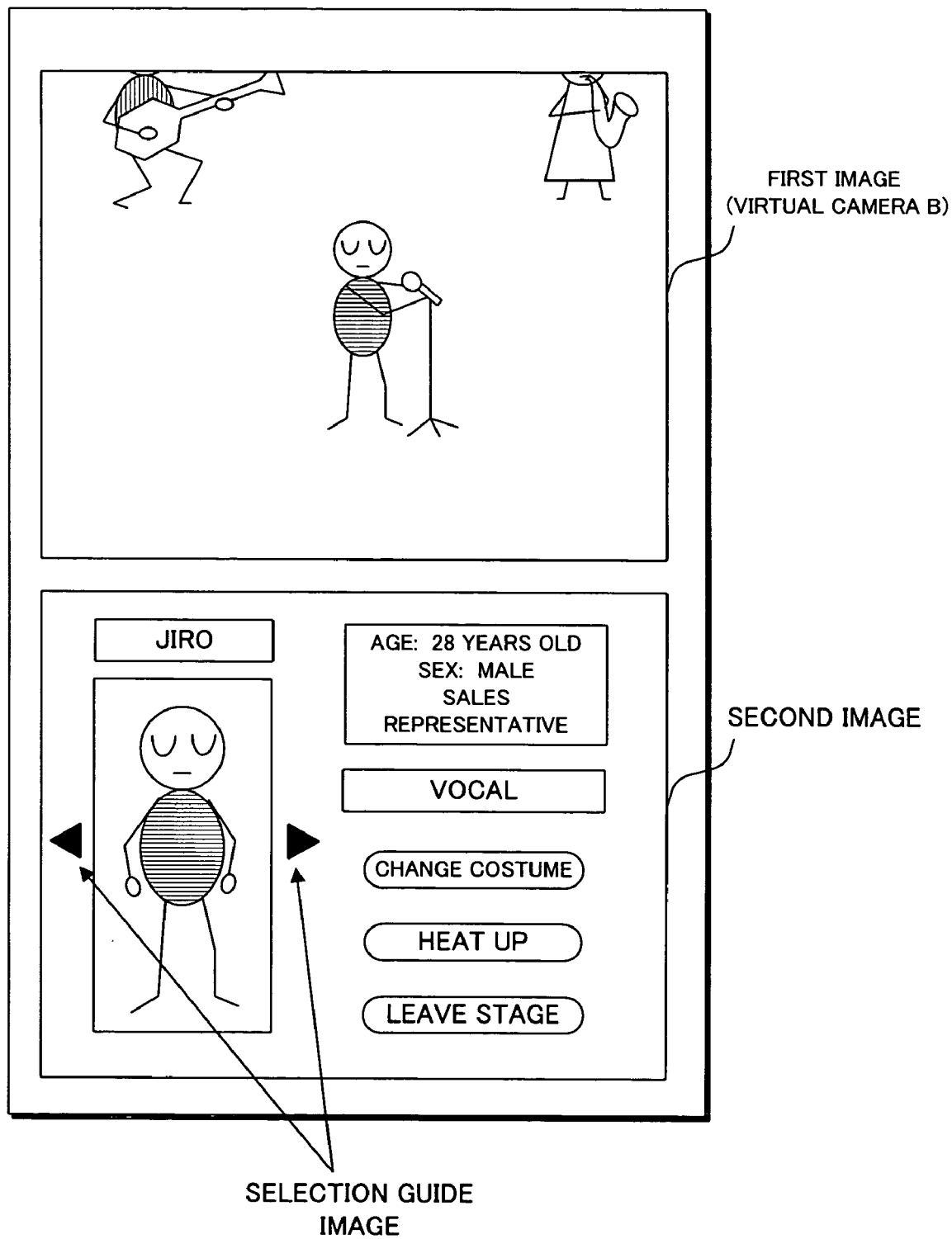
FIG. 5 is an illustration showing another example of the first image and the second image while the game is being played.

In FIG. 4, a selection guide image is an image for guiding the player through an operation for changing the feature information displayed on the second LCD 12 to that of another character. In the example of FIG. 4, the selection guide image teaches that pressing the right portion of the cross key leads to a change of the feature information to that of another character. Here, when the player presses the right portion of the cross key, feature information of another character (which is named "Jiro" in this example) is displayed. Simultaneously, the target character is changed from "Taro" to "Jiro". With the change of the target character, the first image to be displayed on the first LCD 11 is changed to an image captured by the virtual camera B. In FIG. 5, the selection guide image teaches that pressing the right or left portion of the cross key leads to a change of the feature information to that of another character (in other words, a change of the target character). Since the selection guide image is displayed on the second LCD 12, no guide image is required to be displayed on the first LCD 11 for changing the target character.

In FIG. 4, current-state information indicates a current state of the target character. For example, when the target character is preparing for going up on the stage, "in preparation" is displayed. When the target character is playing the guitar, "playing the guitar" is displayed. When the target character is singing, "vocal" is displayed. With this current-state information, the target character can be distinguished from the other characters. Therefore, the current-state information can be a type of the feature information.

In FIG. 4, commands are instructions for providing changes to the state or motion of the character. A "COSTUME CHANGE" command is to change the costume of the character. A "HEAT UP" command is to excite the player character. A "LEAVE STAGE" command is to have the character leave the stage. Viewing the second image displayed on the second LCD 12, the player can select a desired command by pressing the upper or lower portion of the cross key (the currently-selected command is presented to the player with a cursor or as being highlighted or darkened, for example), and then input the selected command by pressing the A button. For example, when the player inputs the "CHANGE COSTUME" command, a costume-changing screen that allows the player to select a costume of the target character is displayed on the second LCD 12. In accordance with an input from the player on that costume-changing screen, the costume of the character is changed. When the player inputs the "HEAT UP" command, the target character enters in a state of being excited (heating up), and the motion of the target character displayed on the first LCD 11 becomes vigorous accordingly. At the same time, the portrait image displayed on the second LCD 12 is changed to a portrait image representing the heating-up character, thereby clearly demonstrating to the player that the target character is now heating up. Then, after a predetermined period of time (for example, 60 seconds) has elapsed, the target character cools down, thereby causing its motion to return to normal and its portrait image to be changed to a normal image. When the player inputs the "LEAVE STAGE" command, the target character leaves the stage. As a result, the target character is no longer displayed on the first LCD 11.

Figure 6:
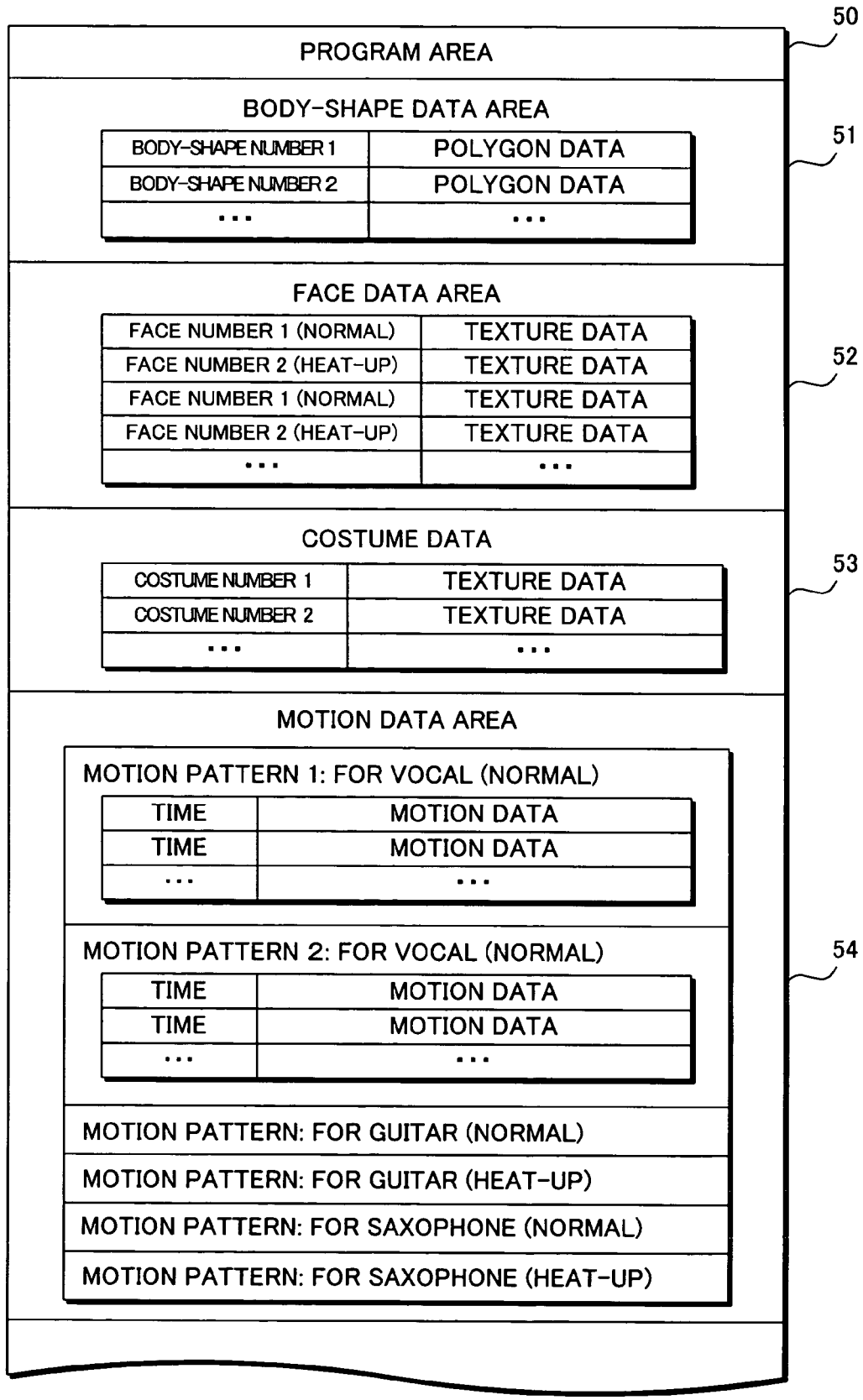
FIG. 6 is a first half of a memory map of a ROM 180 in the first embodiment.
Figure 7:
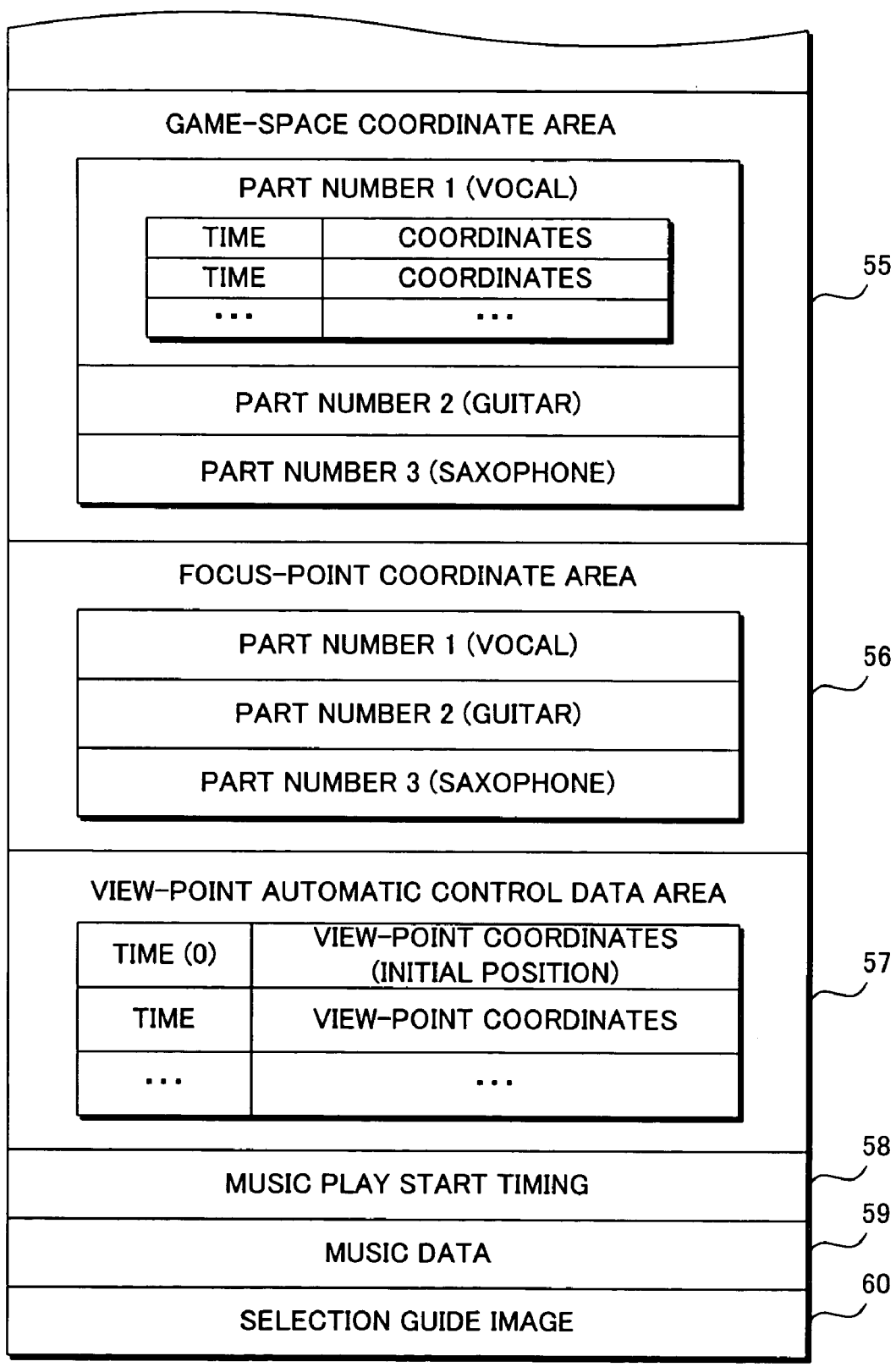
FIG. 7 is the latter half of the memory map of the ROM 180 in the first embodiment.

FIGS. 6 and 7 illustrate a memory map of the ROM 180. In the ROM 180, the game program and the game data for achieving the above-described game are stored.

In FIG. 6, a program area 50 has stored therein a program for causing the CPU core 31 of the game machine 10 to perform a process according to a flowchart shown in FIGS. 9 to 13. A body-shape data area 51 has stored therein a plurality of patterns of polygon data, each representing a character's body shape in association with a body-shape number. A face data area 52 has stored therein a plurality of patterns of polygon data, each representing a character's face in association with a face number and whether the face is in a normal state or in a heating-up state. A costume data area 53 has stored therein a plurality of patterns of texture data, each representing a character's costume in association with a costume number.

A motion data area 54 has stored therein a plurality of motion patterns for controlling the character's motion, the patterns each being associated with a part (vocal, guitar, or saxophone) and whether the motion pattern is in a normal state or in a heating-up state. Each motion pattern includes a series of pieces of motion data. Each piece of motion data is added with time information indicating when which motion data is used. The time information is represented as a time elapsed from a stage start time (step S26 in FIG. 10, which will be described further below). The motion of the character for each part is changed with time using this motion pattern.

In FIG. 7, a game-space coordinate area 55 has stored therein position information for controlling a character's position in the virtual game space, the information being in association with a part number. The position information of each character includes a series of sets of coordinates. Each set of coordinates is added with time information indicating when the character is moved to that set of coordinates (the time information is represented as the elapsed time as described above). With the data in the game-space coordinate area, the character of the character for each part is moved with time after the start of the stage.

A focus-point coordinate area 56 has stored therein coordinates for determining a focus point of the virtual camera of the character selected as the target character, the coordinates being associated with the part number. The coordinates stored in this focus-point coordinate area 56 indicate a positional relative relationship with the position of the character in the virtual game space. That is, the coordinates of the character and the coordinates stored in the focus-point coordinate area 56 in the virtual game space define the coordinates of the focus point in the virtual game space. Specifically, the coordinates of the focus are calculated by adding the coordinates stored in the focus point-coordinate area 56 to the coordinates of the character in the virtual game space.

A view-point automatic control data area 57 has stored therein information for the computer to automatically control a view point (that is, the position of the virtual camera in the virtual game space). More specifically, the view-point automatic control data area 57 has stored therein a series of sets of view-point coordinates, each set being added with time information indicating when to move the view point to that coordinates (the time information is represented as described above). The view point is moved with time after the start of the stage using the view point automatic control data.

Other than the above-described game data, a music play start time 58, music data 59, and a selection guide image 60 are stored in the ROM 180.

Figure 8:
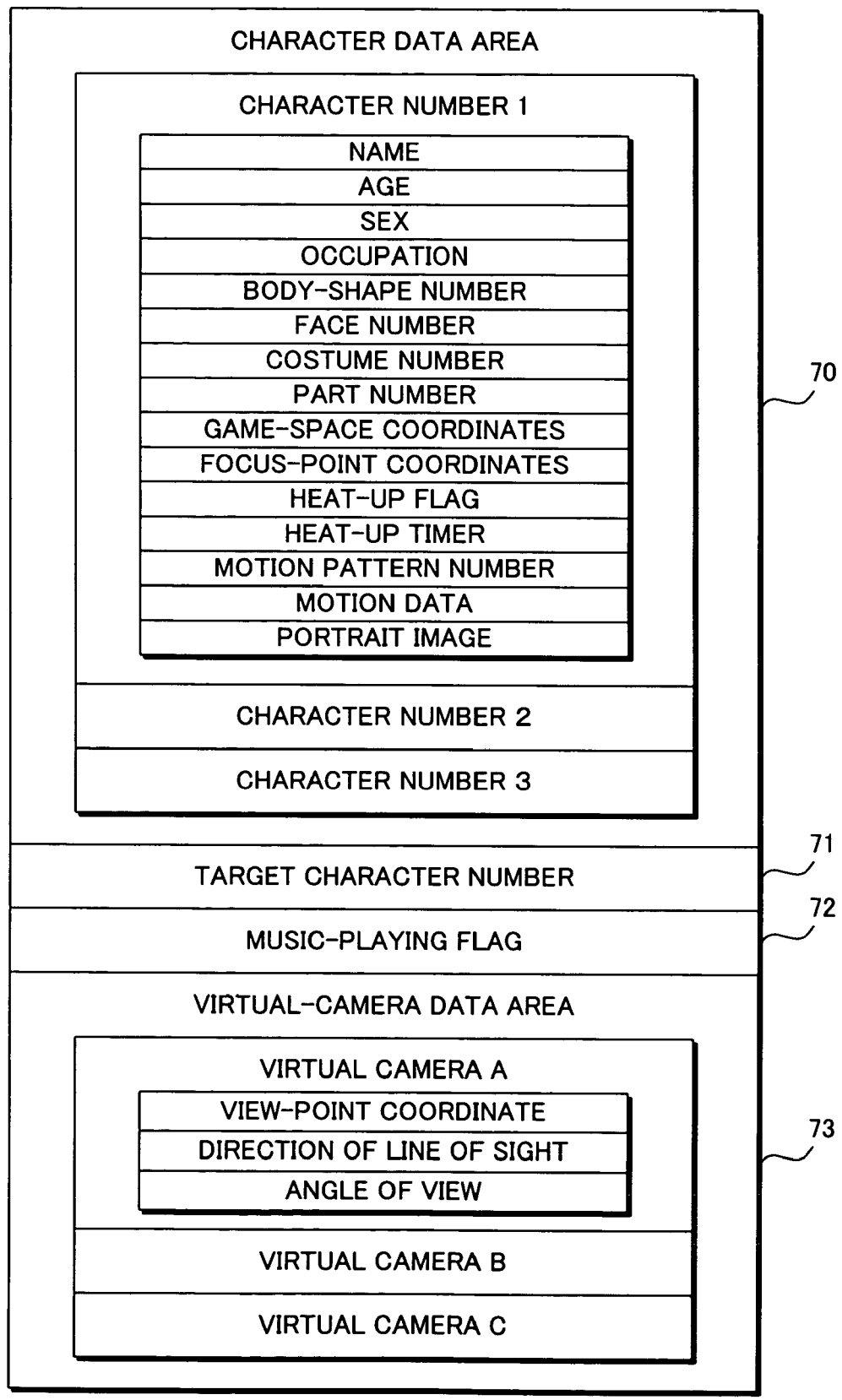
FIG. 8 is a memory map of a RAM 37 in the first embodiment.

FIG. 8 is a memory map of the RAM 37. In the RAM 37, the game program and the game data read from the ROM 180 and game data generated through the game process are temporarily stored.

In FIG. 8, the character data area 70 has stored therein, in association with a character number, a variety of data regarding each character (name, age, sex, occupation, body-shape number, costume number, part number, game-space coordinates, focus-point coordinates, heat-up flag, heat-up timer, motion pattern number, motion data, and portrait image). The part number indicates a part (vocal, guitar, or saxophone) of which the character is in charge. The game-space coordinates indicate a current position of the character in the virtual game space. The focus-point coordinates are to determine coordinates (in the game space) of the focus point when the character becomes the target character. The heat-up flag is a flag indicative of whether the character is currently being excited (heating up). While the character is heating up, the heat-up flag is set (ON). After the character cools down, the heat-up flag is reset (OFF). The heat-up timer counts an elapsed time after the character becomes excited. The motion pattern number is a number indicative of a motion pattern to be used for controlling the motion of the character. The motion data is data for controlling the current motion of the character.

A target character number 71 indicates the number assigned to the character currently set as the target character. A music-playing flag 72 is a flag indicative of whether the character has started playing music in the virtual game space.

A virtual-camera data area 73 has stored therein, for each of the virtual cameras (the virtual cameras A, B, and C), focus-point coordinates (that is, the position of the virtual camera), a direction of a line of sight (that is, a direction from the position of the virtual camera to the focus point), and an angle of view. The angle of view is a parameter having an influence over a scaling for image display. One of these three virtual cameras stored in the virtual-camera data area 73 is selected, and then the data regarding the selected virtual camera data (its position, direction of the line of sight, and angle of view) is used for generating a game image.

With reference to the flowchart shown in FIGS. 9 through 13, a flow of a game process based on the above-described game program and game data is described.

Figure 9:
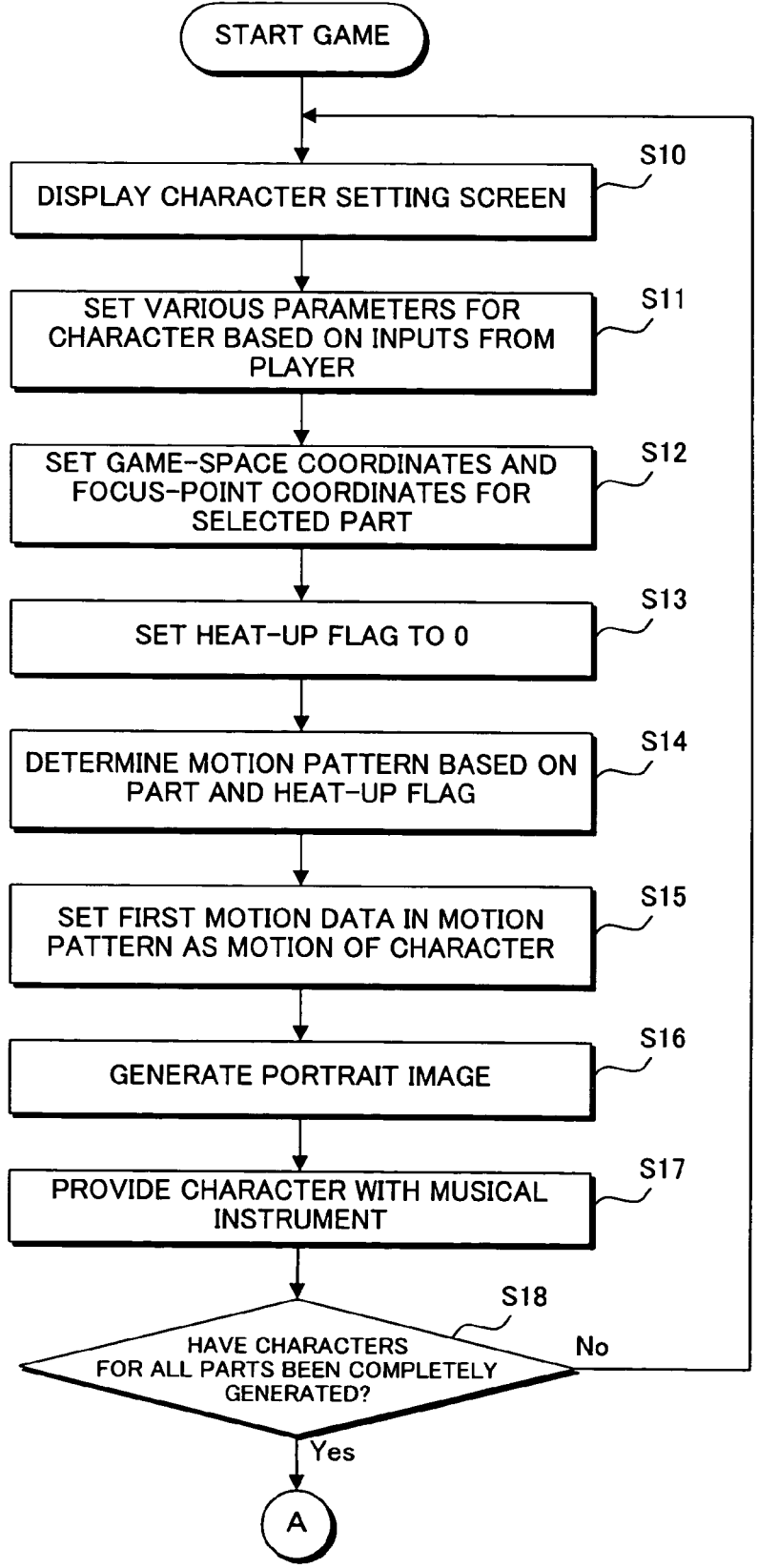
FIG. 9 is a part of a flowchart showing a flow of a game process.

In FIG. 9, when the game is started, the CPU core 31 first performs a process for generating a character. More specifically, processes in steps S10 through S17 are repeated for each character, thereby generating a plurality of characters. Hereinafter, the processes in steps S10 through S17 are described.

First, the CPU core 31 causes a character setting screen for a first character to be displayed on the second LCD 12 (S10). The character setting screen is a screen for setting various parameters for the character and, more specifically, for allowing the player to determine the character's name, sex, age, occupation, body shape, face, costume, and part. Based on the inputs from the player, the CPU core 31 determines the character's name, sex, age, occupation, body-shape number, face number, costume number, and part number, and then causes these parameters to be stored in the character data area 70 of the RAM 37 (S11). Then, based on the determined part number and the data stored in the game-space coordinate area 55 of the ROM 180 (data corresponding to time information indicative of 0) and the data stored in the focus-point coordinate area 56 thereof, the game-space coordinates and the focus-point coordinates are determined for that character, and are stored in the character data area 70 of the RAM 37 (S12).

Next, the CPU core 31 sets the heat-up flag stored in the character data area 70 of the RAM 37 for the character to 0 (OFF) (S13). Then, based on the part number and the heat-up flag, the motion pattern of that character is determined (any one of six motion patterns shown in FIG. 6 is selected), and its number is stored in the character data area 70 of the RAM 37 (S14). Also, the first motion data in the determined motion pattern is read from the motion data area 54 of the ROM 180, and is then stored in the character data area 70 of the RAM 37 (S15).

Next, the CPU core 31 generates a portrait image of that character, and then causes the generated portrait image to be stored in the character data area 70 of the RAM 37 (S16). More specifically, the CPU core 31 performs a rendering process based on polygon data and texture data determined based on the character's body shape number, face number, costume number, and heat-up flag, and then stores the resultant image in the RAM 37 as the portrait image.

Next, the CPU core 31 provides the character with a musical instrument (or a microphone for vocals) corresponding to the part number (S17). Then it is determined whether characters for all parts have been generated (S18). If there is a character for a part that has not yet been generated, the procedure returns to step S10 for generating a new character. If characters for all parts have eventually been generated, the procedure goes to step S20 in FIG. 10.

In FIG. 10, the CPU core 31 sets the target character number 71 stored in the RAM 37 to an initial value of 1 (S20). Then, the CPU core 31 sets the view-point coordinates of each virtual camera and the angle of view stored in the virtual-camera data area 73 of the RAM 37 to initial values (S21). Specifically, the view-point coordinates are set to first data stored in the view-point automatic control data area 57, while the angle of view is set to a predetermined fixed value. Next, based on the view-point coordinates of the virtual cameras and the focus-point coordinates of the characters corresponding to the virtual cameras, a direction of a line of sight of each virtual camera is determined, and is then stored in the virtual-camera data area 73 of the RAM 37 (S22). Note that the processes in steps S21 and S22 are performed for each of the virtual cameras (the virtual cameras A, B, and C).

Figure 14:
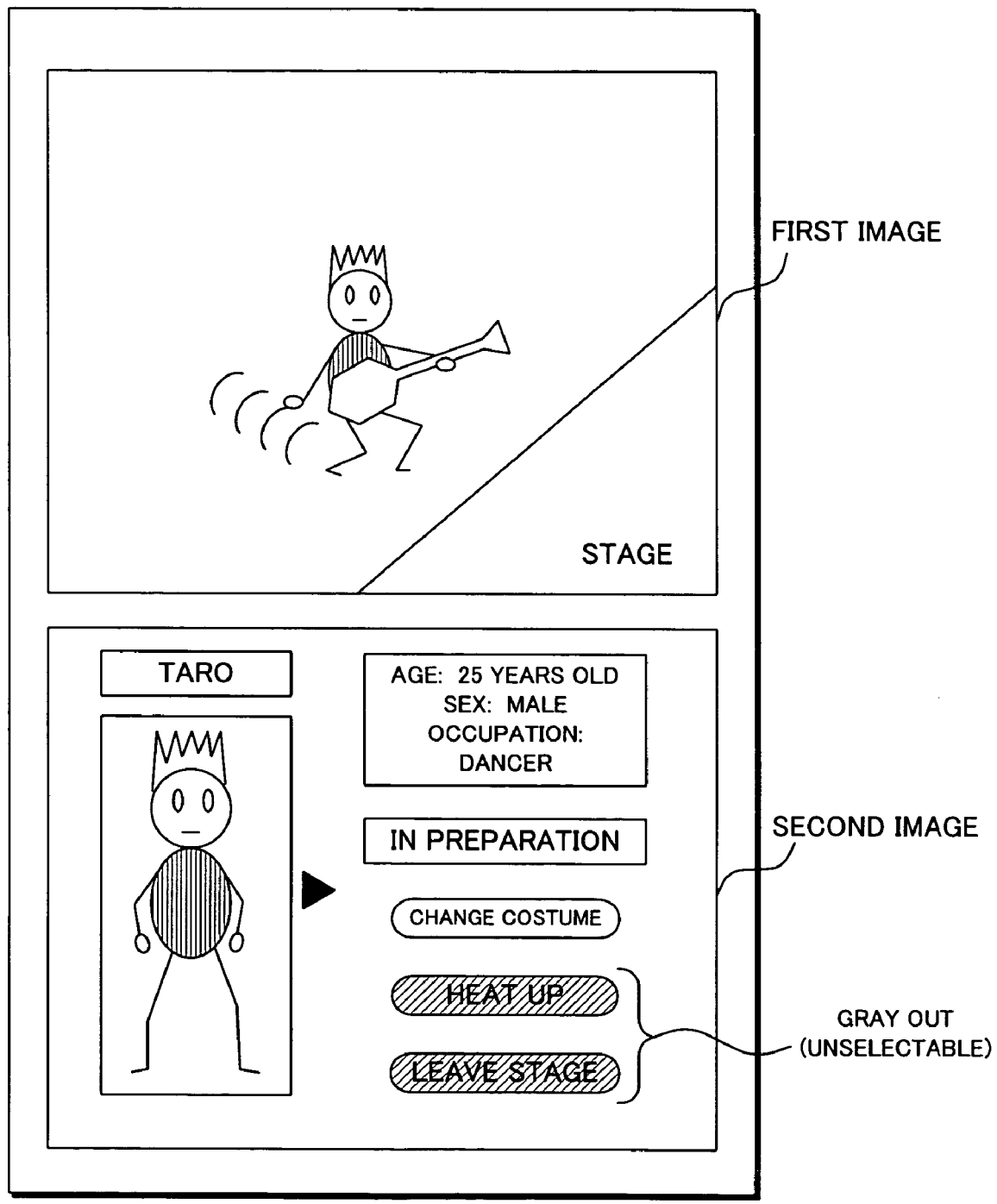
FIG. 14 is an illustration showing still another example of the first image and the second image while the game is being played.

Next, the CPU core 31 generates an image (first image) indicative of a state of the virtual game space viewed from the virtual camera (here, the virtual camera A) corresponding to the target character number 71 (here, 1) based on the focus-point coordinates and the direction of the line of sight of the virtual camera, and then causes the generated image to be displayed on the first LCD 11 (S23). Then, an image (second image) is generated based on the data stored in the character data area 70 of the RAM 37, the image including the feature information and the current-state information (here, "in preparation") regarding the character corresponding to the target character number 71 (here, 1), the commands, and the selection guide image, and is then displayed on the second LCD 12 (S24). In the second image generated in this step S24, as shown in FIG. 14, the "HEAT UP" command and the "LEAVE STAGE" command are grayed out (or hatched), indicating to the player that these commands cannot be currently entered. These commands are not effective until the character appears on the stage and starts playing music.

Next, the CPU core 31 sets the music playing flag 72 stored in the RAM 37 OFF (S25), and then causes the timer to start counting (S26).

Next, the CPU core 31 determines whether the music play start time has come (S27). This determination is made by comparing a count value of the timer started in step S26 with the music play start time 58 stored in the ROM 180. Until the music play start time comes, images of each character appearing from the backstage and then moving to a predetermined position on the stage are displayed.

When determining in step S27 that the music play start time has come, the CPU core 31 sets the "HEAT UP" command and the "LEAVE STAGE" command in the second image to normal display (that is, releases gray-out of these commands) (S28). With this, the player can recognize that these commands can be now entered. Then, based on the music data 59 stored in the ROM 180, music play is started (S29). Then, the music playing flag 72 stored in the RAM 37 is set ON (S30).

Figure 11:
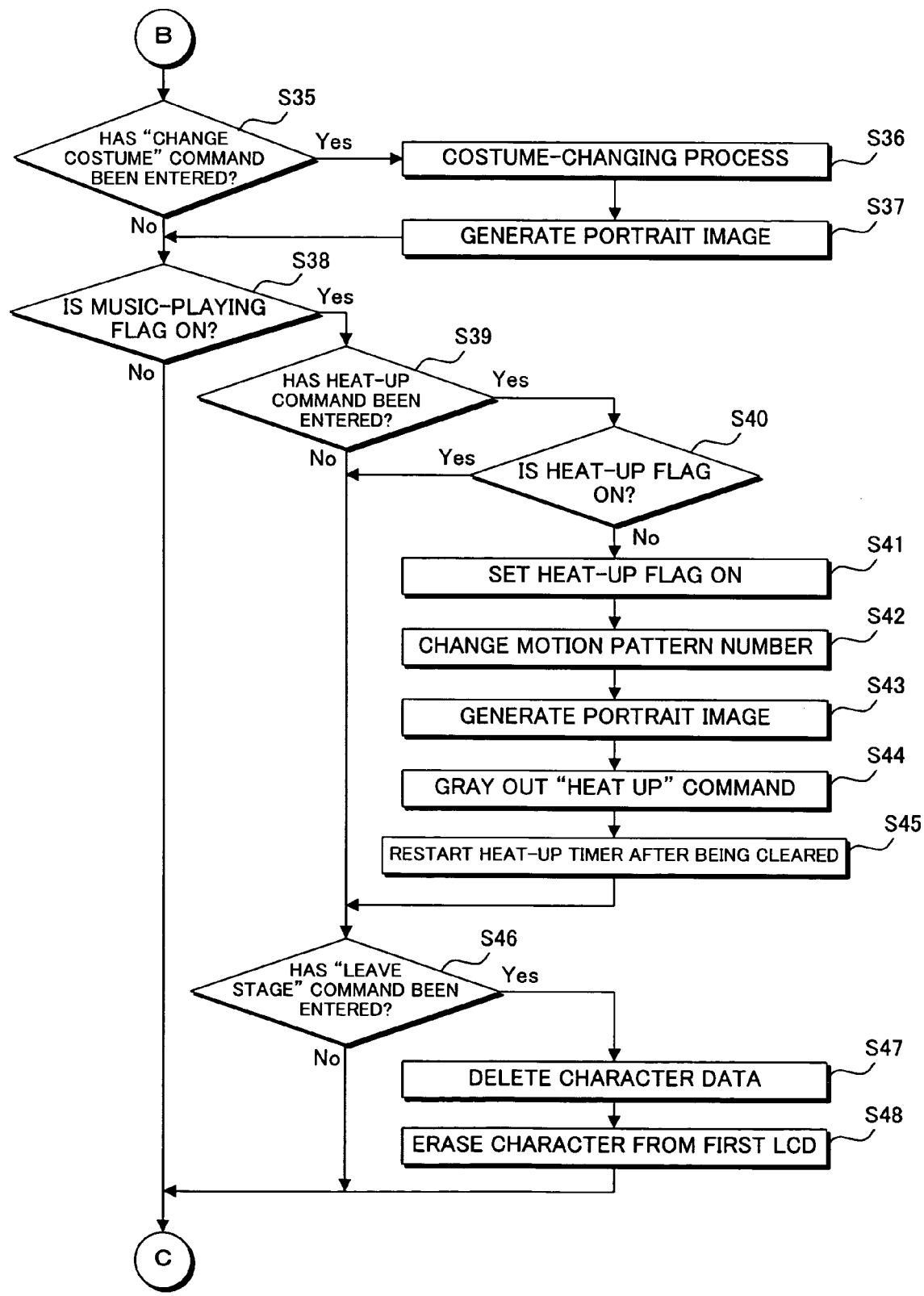
FIG. 11 is still another part of the flowchart showing the flow of the game process.

In FIG. 11, the CPU core 31 determines whether the "CHANGE COSTUME" command has been entered by the player (S35). If the "CHANGE COSTUME" command has been entered, the CPU core 31 performs a costume changing process for the target character (S36). Specifically, the target character is specified based on the target character number 71 stored in the RAM 37. Then, a screen for allowing the player to reselect a costume of the target character is displayed on the second LCD 12. Based on inputs from the player, the costume number of the target character stored in the character data area 70 of the RAM 37 is then updated. Then, based on the updated costume number, the CPU core 31 generates a portrait image of the target character, and then causes the generated image to be stored in the character data area 70 of the RAM 37 (S37). Here, a process of generating a portrait image is similar to the above-described process in step S16.

Next, the CPU core 31 determines whether the music playing flag 72 in the RAM 37 is ON (S38). If the music playing flag 72 is ON, it is further determined whether the "HEAT UP" command or the "LEAVE STAGE" command has been entered (S39). That is, entries of the "HEAT UP" command and the "LEAVE STAGE" command are accepted only when the music playing flag 72 is ON.

Figure 15:
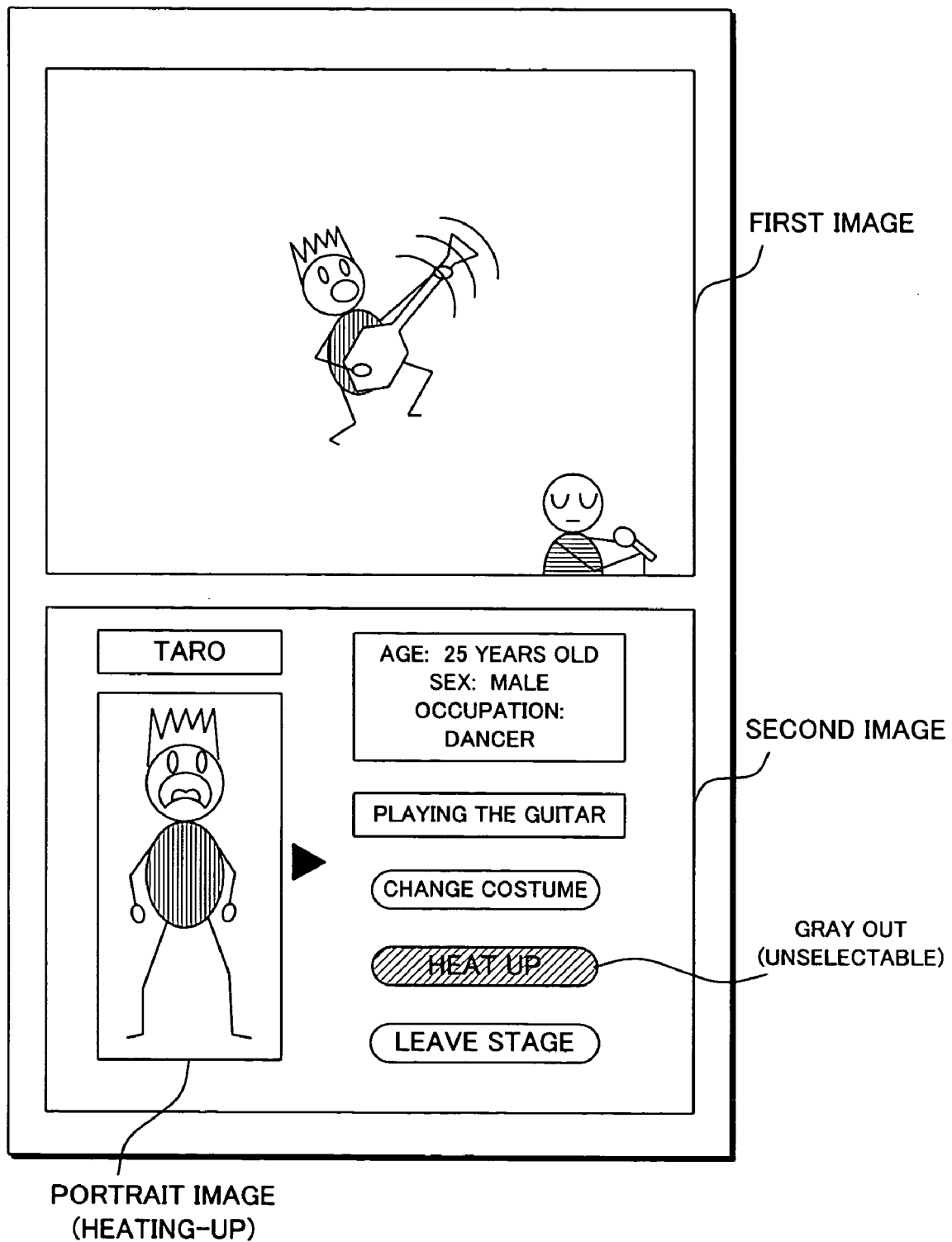
FIG. 15 is an illustration showing still another example of the first image and the second image while the game is being played.

In step S39, when it is determined that the "HEAT UP" command has been entered, the CPU core 31 specifies the target character, based on the target character number 71 stored in the RAM 37. The CPU core 31 then determines whether the heat-up flag of the target character stored in the character data area 70 is ON (S40). If the heat-up flag is not ON, it is set ON (S41), and further the motion pattern number of the target character stored in the character data area 70 of the RAM 37 is changed so that the motion pattern of the target character is changed to a motion pattern at the time of heating up (S42). Based on the changed heat-up flag, the CPU core 31 generates a portrait image of the target character, and then stores the generated portrait image in the character data area 70 of the RAM 37 (S43). A process of generating a portrait image is similar to the above-described process in step S16. With this, as shown in FIG. 15, the portrait image at the time of heating up is displayed on the second LCD 12. The CPU core 31 then grays out the "HEAT UP" command in the second image, as shown in FIG. 15 (S44). This indicates to the player that the "HEAT UP" command cannot be currently entered. Furthermore, the CPU core 31 clears the heat-up timer of the target character stored in the character data area 70 of the RAM 37, and restarts the heat-up times for counting (S45). When the count value of the heat-up time reaches a predetermined value, the character cools down (steps S55 through S58, which will be described further below).

When it is determined in step S46 that the "LEAVE STAGE" command has been entered, the CPU core 31 specifies the target character, based on the target character number 71 stored in the RAM 37, and then deletes the data of the target character from the character data area 70 (S47). The CPU core 31 then erases the target character from the first LCD 11 (that is, has the target character leave the stage in the virtual game space) (S48).

Figure 12:
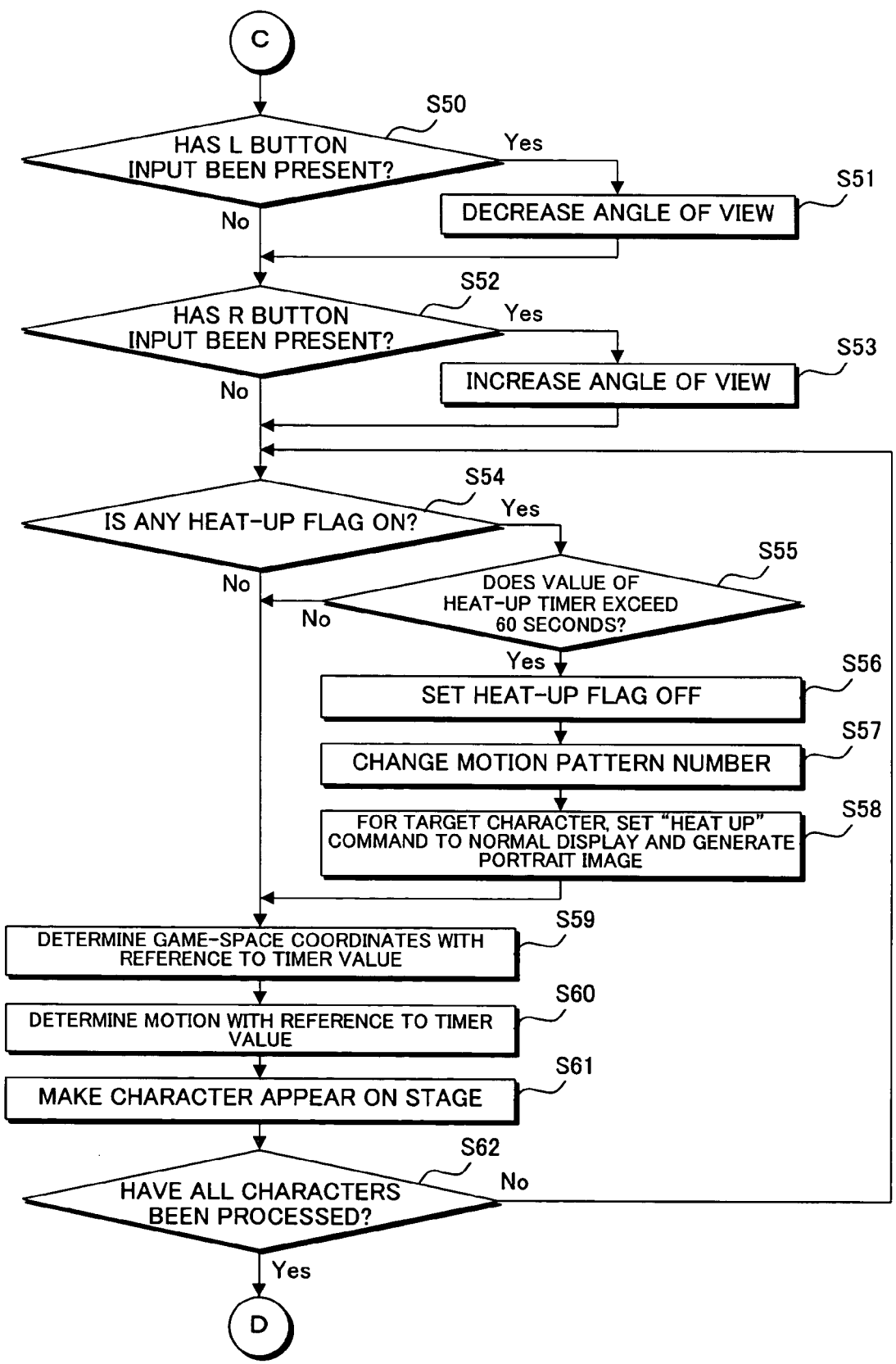
FIG. 12 is still another part of the flowchart showing the flow of the game process.

In FIG. 12, the CPU core 31 determines whether the L button has been pressed by the player (S50). If the L button has been pressed, the angle of view of the virtual camera corresponding to the target character stored in the virtual-camera data area 73 of the RAM 37 is decreased (S51). This process is equivalent to a process of increasing the zoom scaling of the virtual camera. Next, the CPU core 31 determines whether the R button has been pressed by the player (S52). If the R button has been pressed, the angle of the virtual camera corresponding to the target character stored in the virtual-camera data area 73 of the RAM 37 is increased (S53). This process is equivalent to a process of decreasing the zoom scaling of the virtual camera. Although the angle of view of the virtual camera is changed with an operation of the player in the present embodiment, the position of the view point may also be changed with an operation of the player.

Next, the CPU core 31 determines whether the heat-up flag of a character stored in the character data area 70 of the RAM 37 is ON (S54). If the heat-up flag is ON, it is determined whether the count value of the heat-up timer of that character exceeds 60 seconds (S55). If the count value exceeds 60 seconds, the heat-up flag of the character is set OFF (S56), and its motion pattern number is changed to the normal one (S57). Furthermore, if the character is the target character, the display of the "HEAT UP" command in the second image is returned to normal as shown in FIG. 4 (that is, gray-out display is cleared). Also, based on the changed heat-up flag, a portrait image of the target character is generated, and is then stored in the character data area 70 of the RAM 37 (S58). With this, the portrait image at normal times is displayed on the second LCD 12 as shown in FIG. 4.

Next, based on the value of the timer started for counting in step S26 and the coordinate data of the character stored in the game-space coordinate area 55 of the ROM 180, the CPU core 31 determines the coordinates of the character (game-space coordinates) in the virtual game space, and then causes the coordinates to be stored in the character data area 70 (S59). Similarly, based on the timer value and the motion pattern of the character stored in the motion data area 54 of the ROM 180, the motion of the character (motion data) is determined, and is then stored in the character data area 70 of the RAM 37 (S60). Next, based on the game-space coordinates and the motion data, the CPU core 31 sets the character in motion in the virtual game space (S61). That is, the coordinates of each vertex of the polygons forming the character in the virtual game space are determined. If the game-space coordinates of each character are changed, the focus-point coordinates stored in the character data area 70 are also changed based on the changed game-space coordinates and the data in the focus-point coordinate area 56.

The CPU core 31 then determines whether all characters have been completely processed through the processes in steps S54 through S61 (S62). If there is a character unprocessed, the procedure returns to step S54 for performing the processes in steps S54 through S61 on that unprocessed character.

Figure 13:
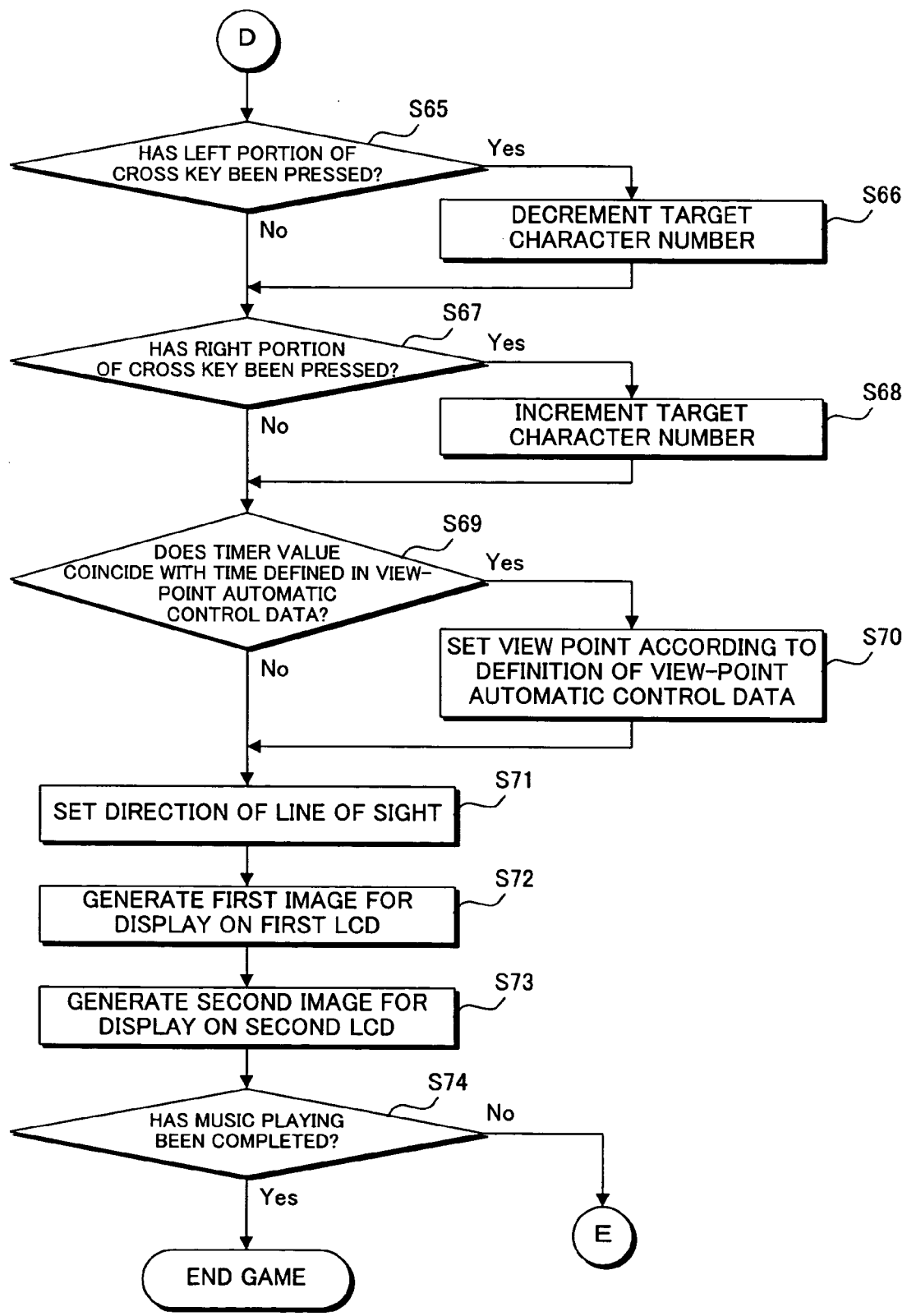
FIG. 13 is still another part of the flowchart showing the flow of the game process.

After all characters are eventually set in motion, in FIG. 13, the CPU core 31 determines whether the left portion of the cross key has been pressed by the player (S65). If the left portion of the cross key has been pressed, the target character number 71 stored in the RAM 37 is decremented (S66). However, if the target character number 71 has already reached a minimum value (here, 1), the target character number 71 is not decremented. That is, even if the player presses the left portion of the cross key in the state shown in FIG. 4, the target character is not changed. Alternatively, in an exemplary modification, if the target character number 71 has already reached the minimum value (here, 1), the target character number 71 may be changed to a maximum value (here, 3).

Furthermore, the CPU core 31 determines whether the right portion of the cross key has been pressed by the player (S67). If the right portion of the cross key has been pressed, the target character number 71 stored in the RAM 37 is incremented (S68). However, if the target character number 71 has already reached the maximum number (here, 3), the target character number 71 is not incremented. Alternatively, in an exemplary modification, if the target character number 71 has already reached the maximum value (here, 3), the target character number 71 may be changed to the minimum value (here, 1).

Next, the CPU core 31 determines whether the value of the timer started for counting in step S26 coincides with any time defined in the view-point automatic control data area 57 of the ROM 180 (S69). If the value coincides with a time, based on the view-point coordinates defined in the view-point automatic control data area 57 that correspond to the time, the CPU core 31 sets the view-point coordinates of the virtual camera corresponding to the target character stored in the virtual-camera data area 73 of the RAM 37 (S70). Furthermore, based on the view-point coordinates of the virtual camera and the focus-point coordinates of the target character, the CPU core 31 sets a direction of a line of sight of the virtual camera stored in the virtual-camera data area 73 of the RAM 37 (S71). In the present embodiment, the view-point coordinates of the virtual camera are automatically changed in the course of the game. Similarly, the angle of view of the virtual camera may be automatically changed. Also, in a specific state, the focus point of the virtual camera may be forcefully changed.

Next, the CPU core 31 generates a first image representing the state of the virtual game space captured by the virtual camera corresponding to the target character, and causes the first image to be displayed on the first LCD 11 (S72). Furthermore, the CPU core 31 generates a second image including the feature information of the target character, and causes the second image to be displayed on the second LCD 12 (S73). The CPU core 31 then determines whether music playing has been completed (S74). If music playing has been completed, the CPU core 31 ends the game process. If music playing continues, the procedure returns to step S27 of FIG. 10.

As described above, according to the present embodiment, the image generated by setting the target character selected by the player as the focus point of the virtual camera is displayed on the first LCD 11. Therefore, by viewing the first LCD 11, the player can more naturally ascertain the current target character. Also, the information for allowing the player to specify the target character is displayed on the second LCD 12. Therefore, while viewing the second LCD 12, the player can select a desired character as the target character. Thus no special image (mark image) for selection of the target character is required to be displayed on the first LCD 11, thereby preventing the worldview of the virtual game space from being impaired.

Figure 16:
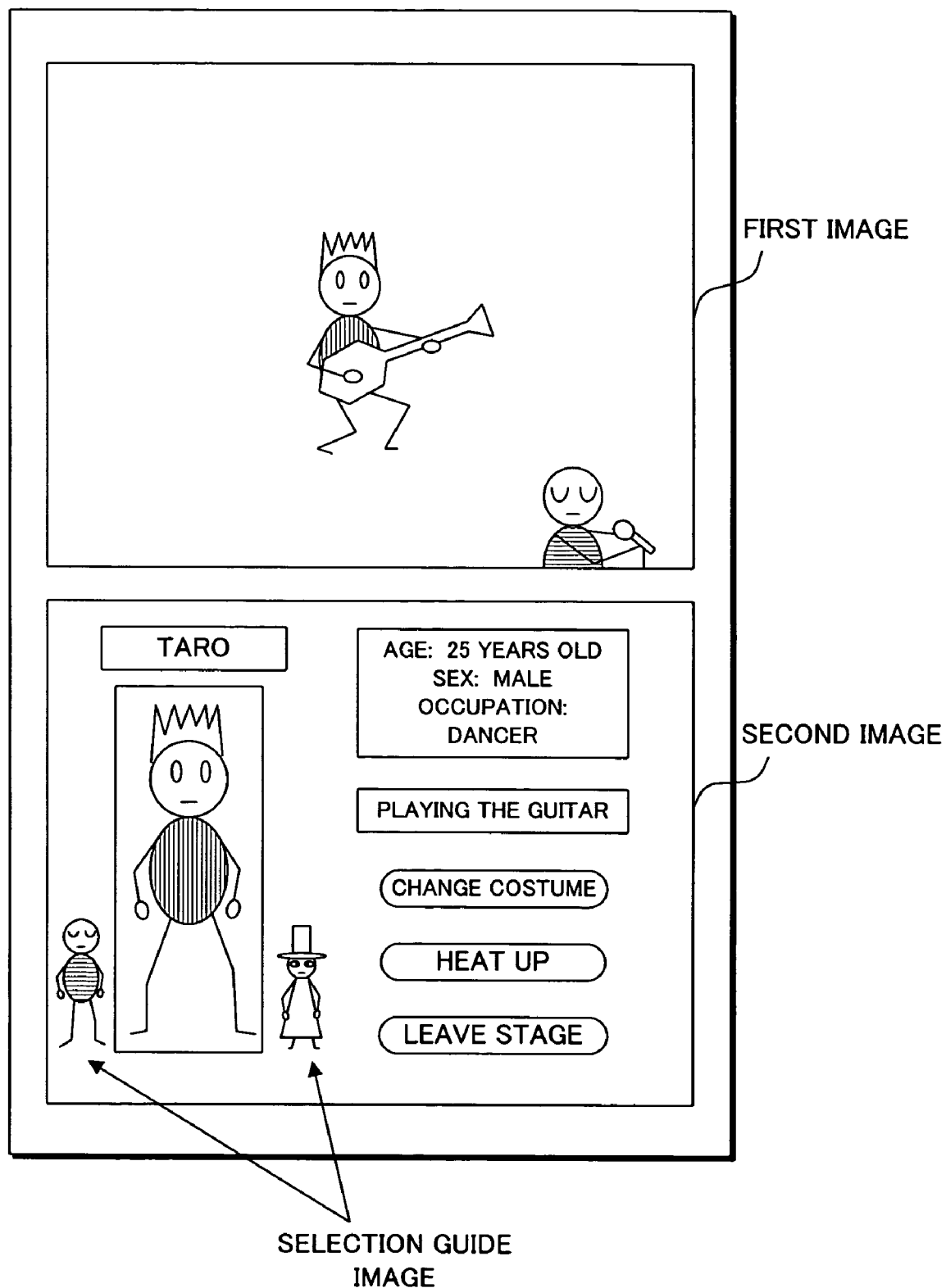
FIG. 16 is an illustration showing still another example of the first image and the second image while the game is being played.

In the present embodiment, the selection guide image as exemplarily shown in FIGS. 14 and 15 is displayed on the second LCD 12. Alternatively, another image may be used as the selection guide image. For example, a selection guide image as shown in FIG. 16 may be used, so as to let the player ascertain that pressing the left portion of the cross key leads to a change of the target character to "Jiro".

Also, in the present embodiment, as shown in FIG. 3, three virtual cameras are provided correspondingly to the characters. This is not meant to be restrictive in the present invention. Alternatively, for example, a single virtual camera may be provided, and the direction of this virtual camera may be changed, as appropriate, to a direction in which the target character is present.

Furthermore, in the present embodiment, the player presses the cross key, the A button, or the like to select the target character or enter a command. This is not meant to be restrictive in the present invention. Alternatively, the touch panel 16 can be used as an input unit for selecting the target character or entering a command. In this case, for example, in FIG. 4, a point on the second LCD 12 where the selection guide image is displayed (that is, a point on the touch panel 16) is touched by a finger or the stick 17, thereby allowing the player to change the target character. Also, a point on the second LCD 12 where the "CHANGE COSTUME" command is displayed (that is, a point on the touch panel 16) is touched by a finger or the stick 17, thereby allowing the player to enter the "CHANGE COSTUME" command.

Figure 17:
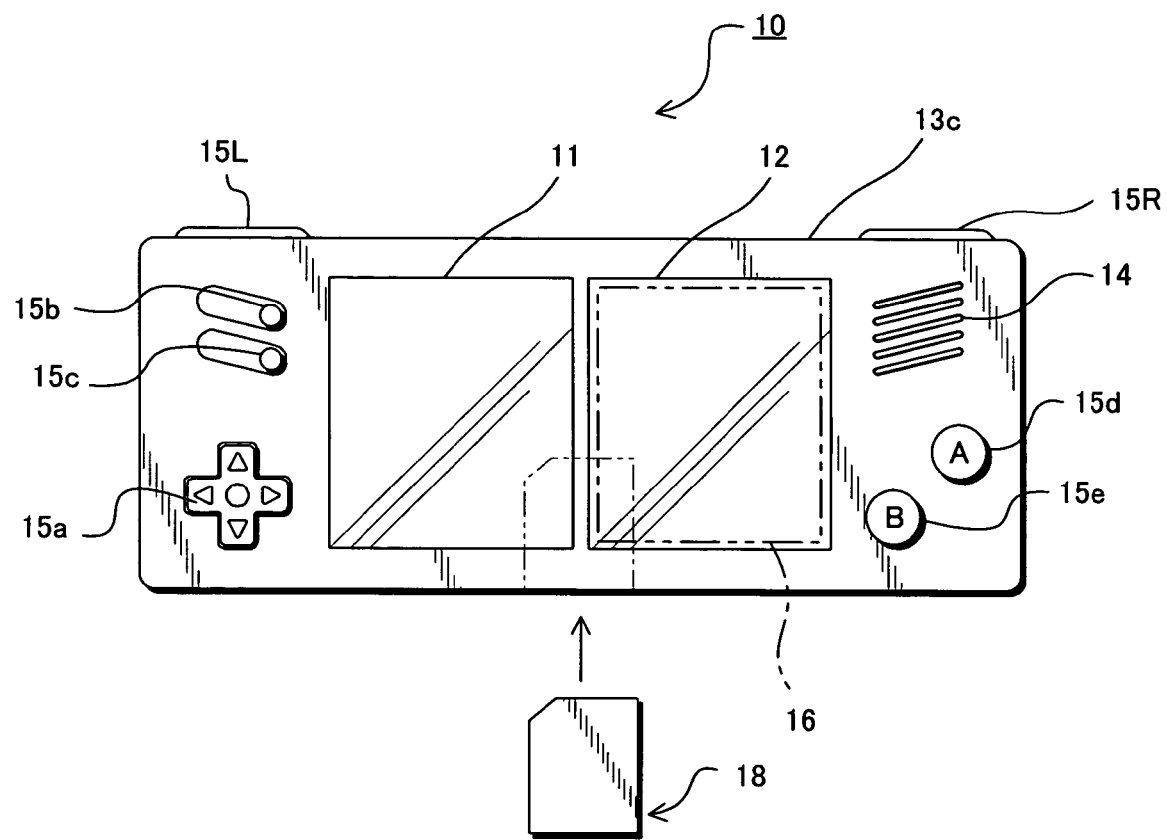
FIG. 17 is an illustration showing an exemplary modification of the game machine.

Still further, in the present embodiment, the game machine is provided with two display units (the first LCD 11 and the second LCD 12) physically separated from each other and disposed so as to be aligned vertically. This is not meant to be restrictive in the present invention. For example, as shown in FIG. 17, two display units (the first LCD 11 and the second LCD 12) are disposed on one horizontally-long housing 13c so as to be aligned horizontally. In this case, in consideration of the fact that the majority of players are right-handed, the second LCD 12 provided with the touch panel 16 is preferably disposed on the right side. However, when game machines for left-handed players are manufactured, the second LCD 12 provided with the touch panel 16 is preferably disposed on the left side.

Still further, in the present embodiment, the state of the virtual game space is displayed on the first LCD 11 disposed on the upper side, while the image including the feature information of the target character is displayed on the second LCD 12 disposed on the lower side. Alternatively, reversal display can suffice. That is, the image including the feature information of the target character may be displayed on the first LCD 11, while the state of the virtual game space may be displayed on the second LCD 12.

Figure 18:
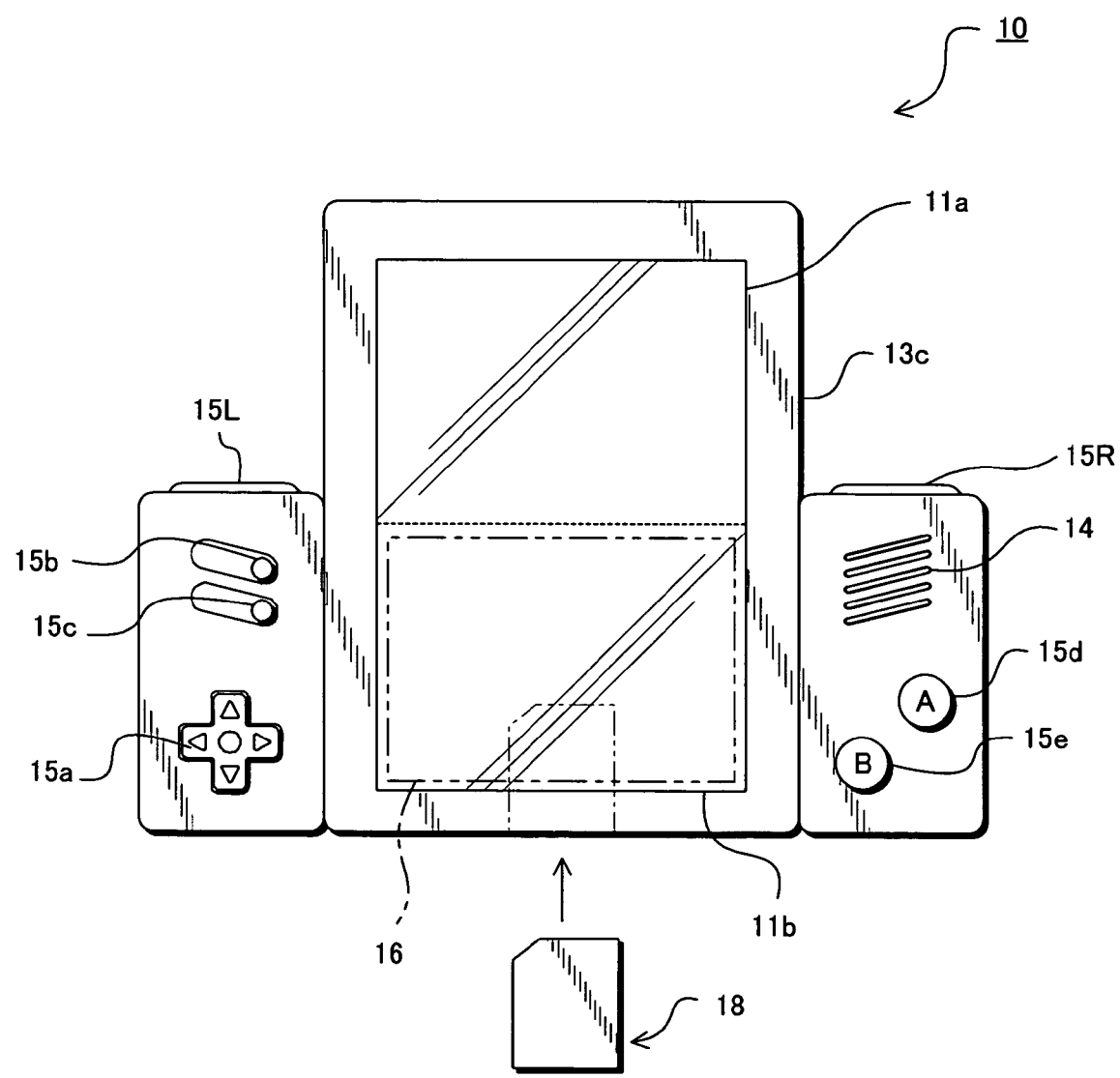
FIG. 18 is an illustration showing another exemplary modification of the game machine.
Figure 19:
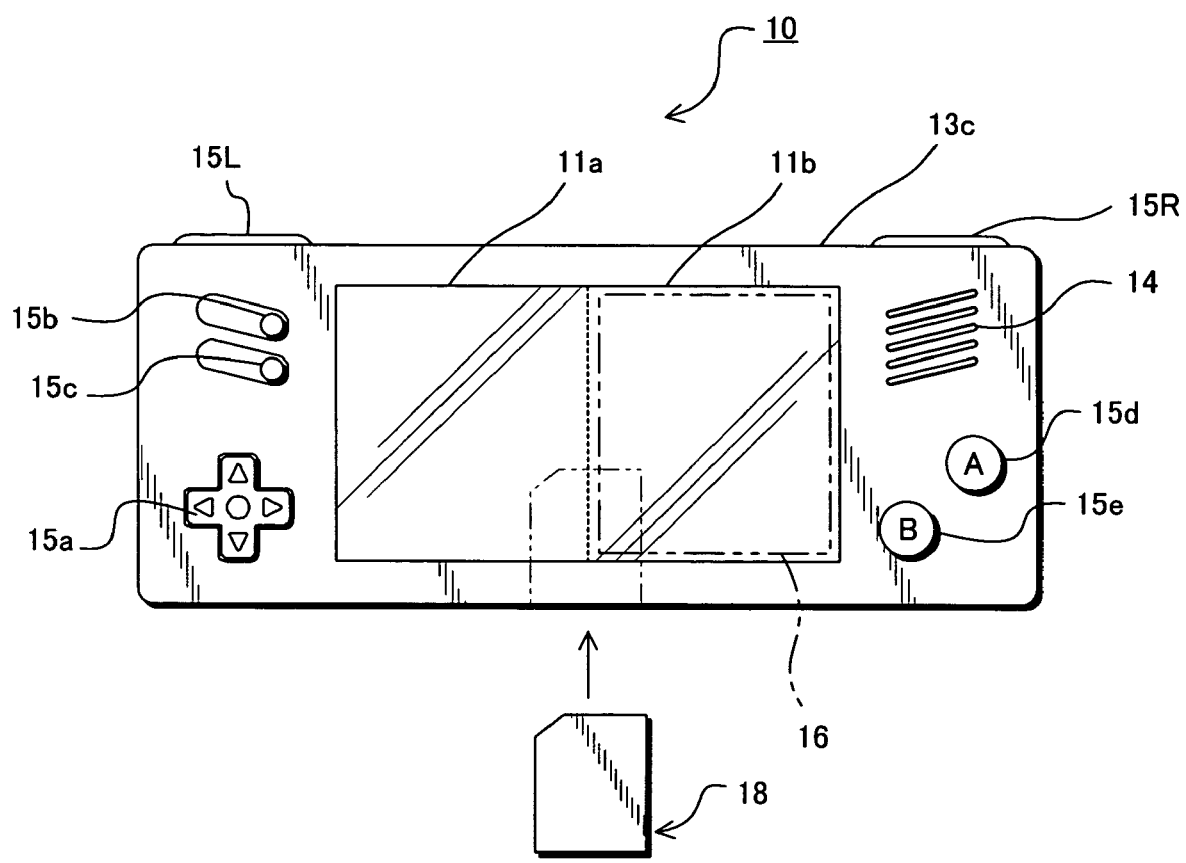
FIG. 19 is an illustration showing still another exemplary modification of the game machine.

Still further, in place of two display units (the first LCD 11 and the second LCD 12) physically separated from each other, one screen may be divided into two areas (an area 11a and an area 11b), as shown in FIGS. 18 and 19, and these two areas may be used as two display units. In this case, for example, the state of the virtual game space is displayed on the area 11a, while the image including the feature information of the target character is displayed on the area 11b.

Figure 20:
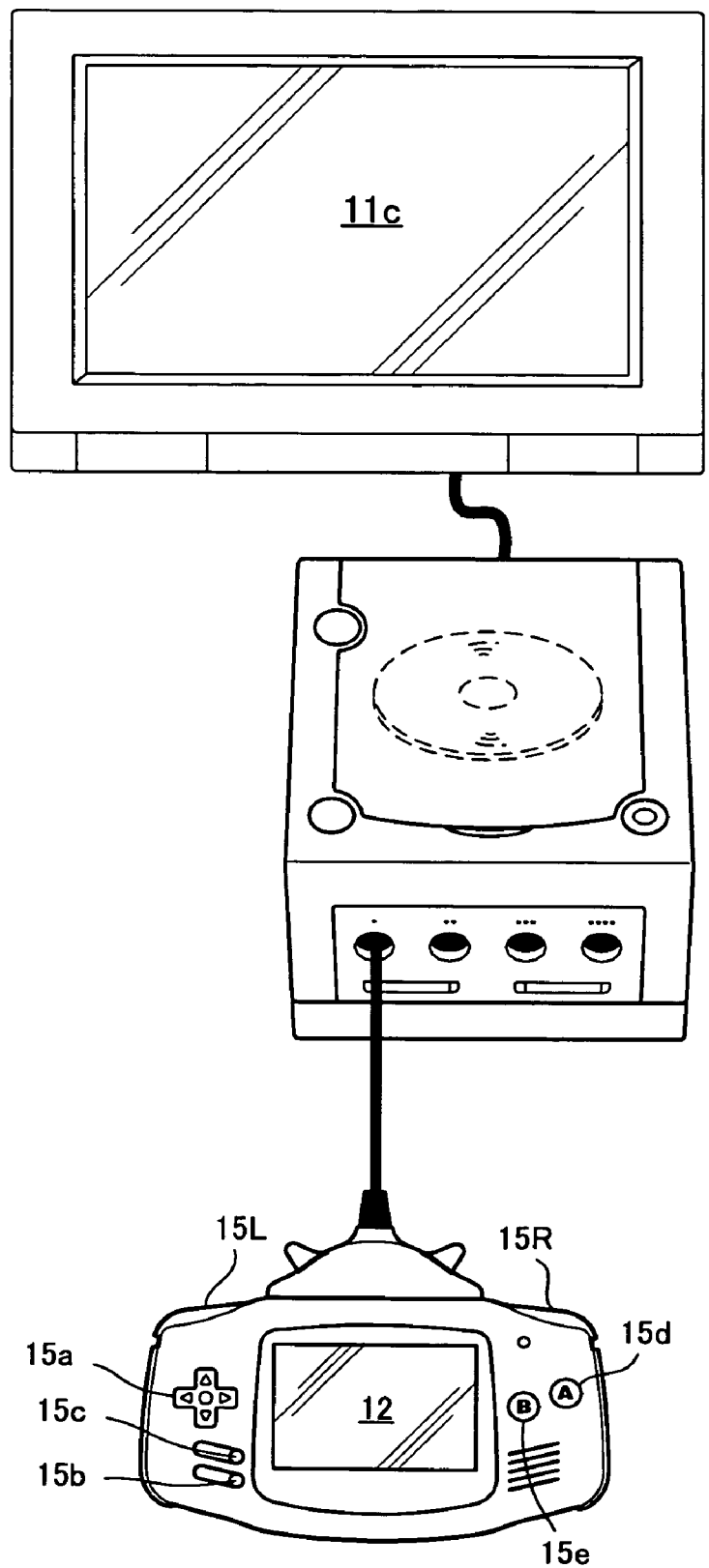
FIG. 20 is an illustration showing still another exemplary modification of the game machine.

Still further, the present invention can be applied to a game system as shown in FIG. 20. In the game system shown in FIG. 20, a TV monitor and a portable game machine are connected to a non-portable game machine. Here, a TV monitor 11c is used as a first display unit, while an LCD 12 of the portable mage machine is used as a second display unit. For example, an image showing the state of the virtual game space is displayed on the TV monitor 11c, while the image including the feature information of the target character is displayed on the LCD 12 of the portable game machine. In this case, the game process shown in FIGS. 9 through 13 is performed typically by a CPU incorporated in the non-portable game machine. However, a part of the game process (for example, a process of generating an image to be displayed on the LCD 12) can be performed by a CPU of the portable game machine.

Second Embodiment

Next, a game machine according to a second embodiment of the present invention is described. In the second embodiment, the hardware structure is similar to that of the first embodiment, and therefore is not described herein. Also, FIGS. 1 and 2 are referred to in the following description.

Figure 21:
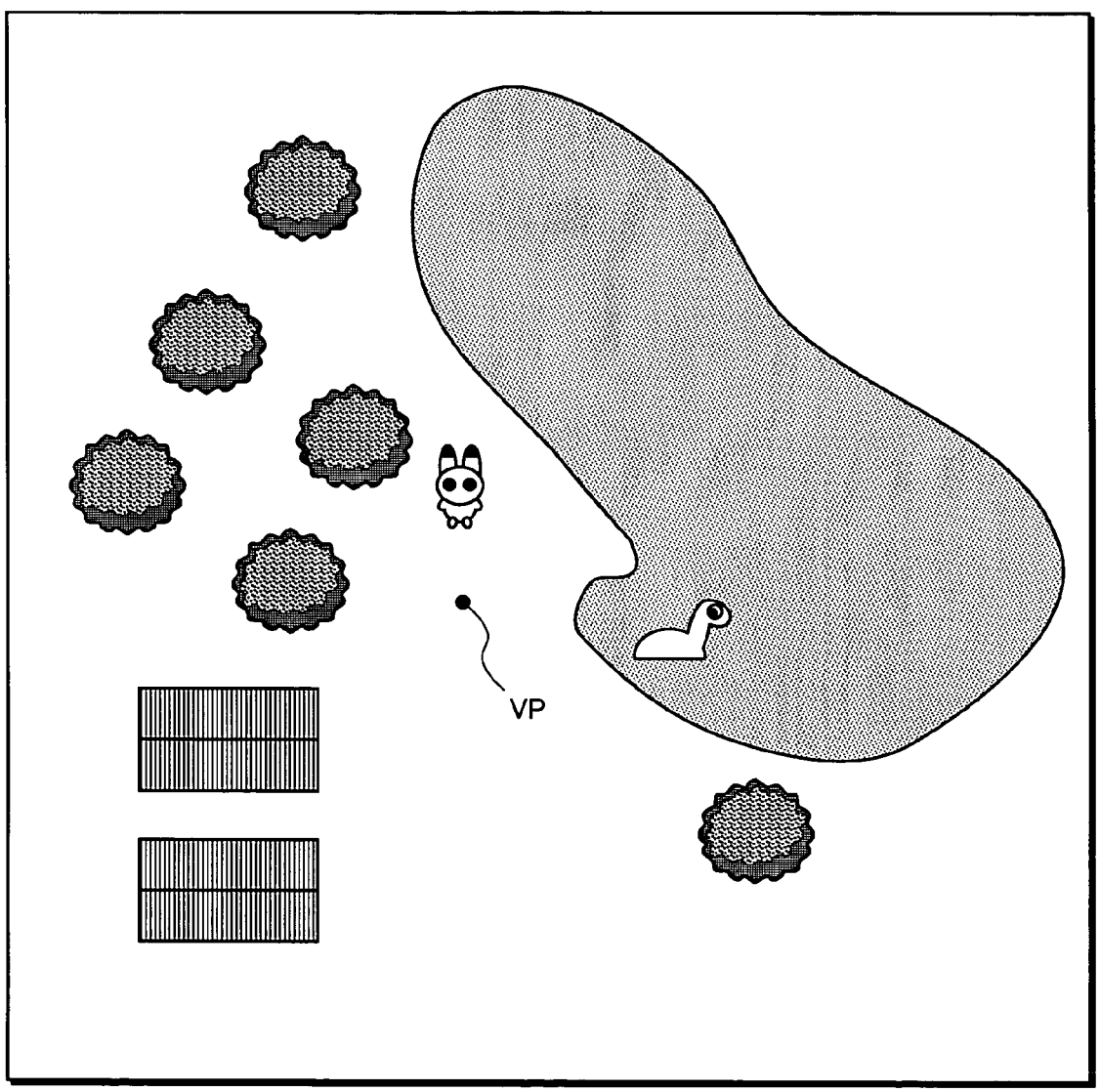
FIG. 21 is an illustration showing an example of a virtual game space in a second embodiment.

The present embodiment exemplifies the case where the present invention is applied to a photograph-taking game. FIG. 21 is an illustration showing a state of a virtual game space in the present embodiment. In the virtual game space, a monster is present. A player observes and takes a photograph of the monster from a viewpoint VP (a position of a virtual camera) in the virtual game space.

Figure 22:
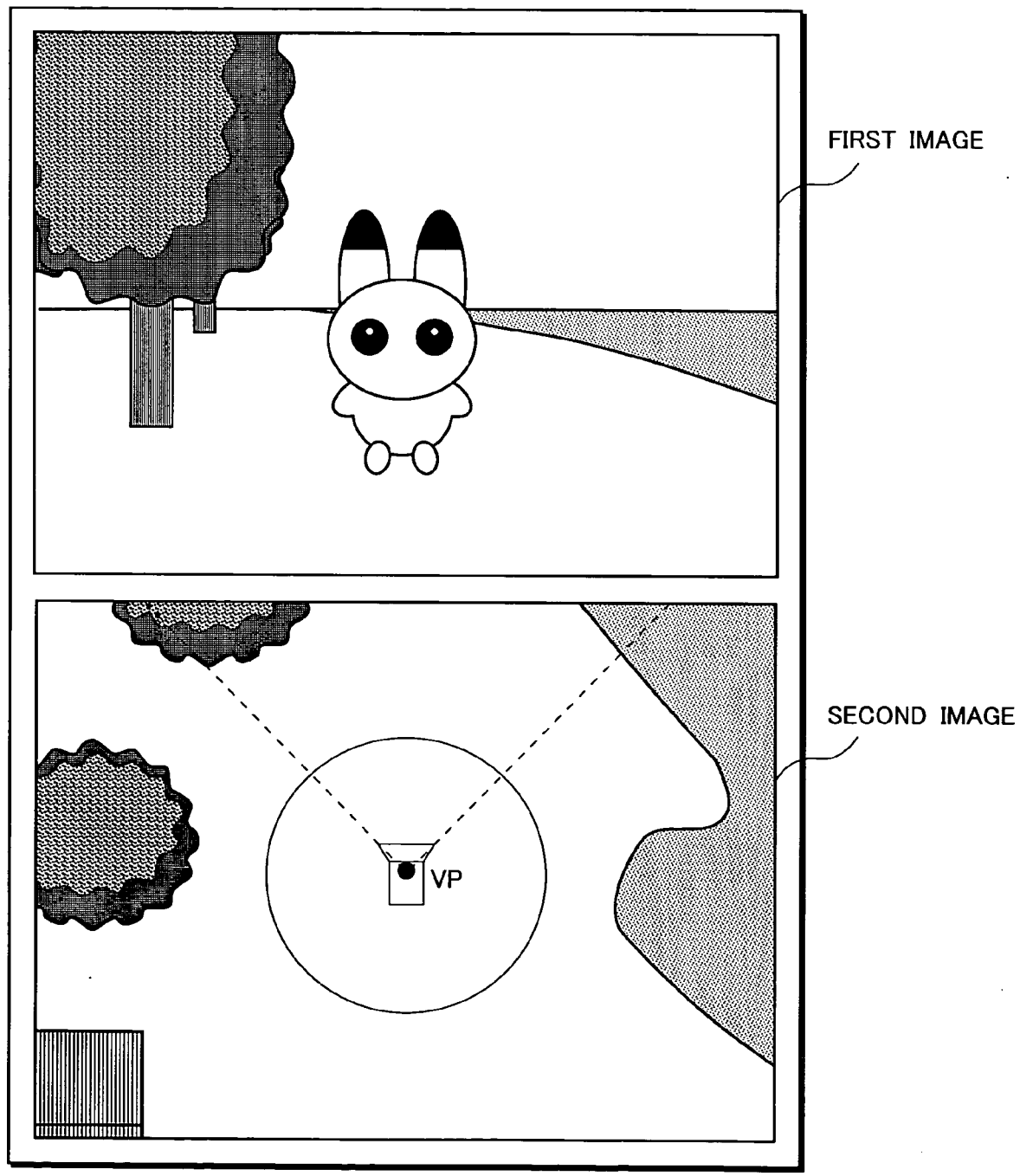
FIG. 22 is an illustration showing an example of a first image and a second image while the game is being played.

FIG. 22 is an illustration showing an example of a first image displayed on the first LCD 11 and a second image displayed on the second LCD while the game is being played. On the first LCD 11, an image representing a state of the virtual game space is displayed viewed from the view point VP with the upward direction in FIG. 21 being taken as a direction of a line of sight. On the second LCD 12, a bird's-eye map schematically representing a state of a predetermined area with the view point VP being taken as the center in the virtual game space viewed from above is displayed. Also, the second image including the image representing the virtual game space is displayed with an icon schematically representing a virtual camera, a circle displayed so as to always have a predetermined size on the second screen, and dotted lines representing a range of view.

Figure 23:
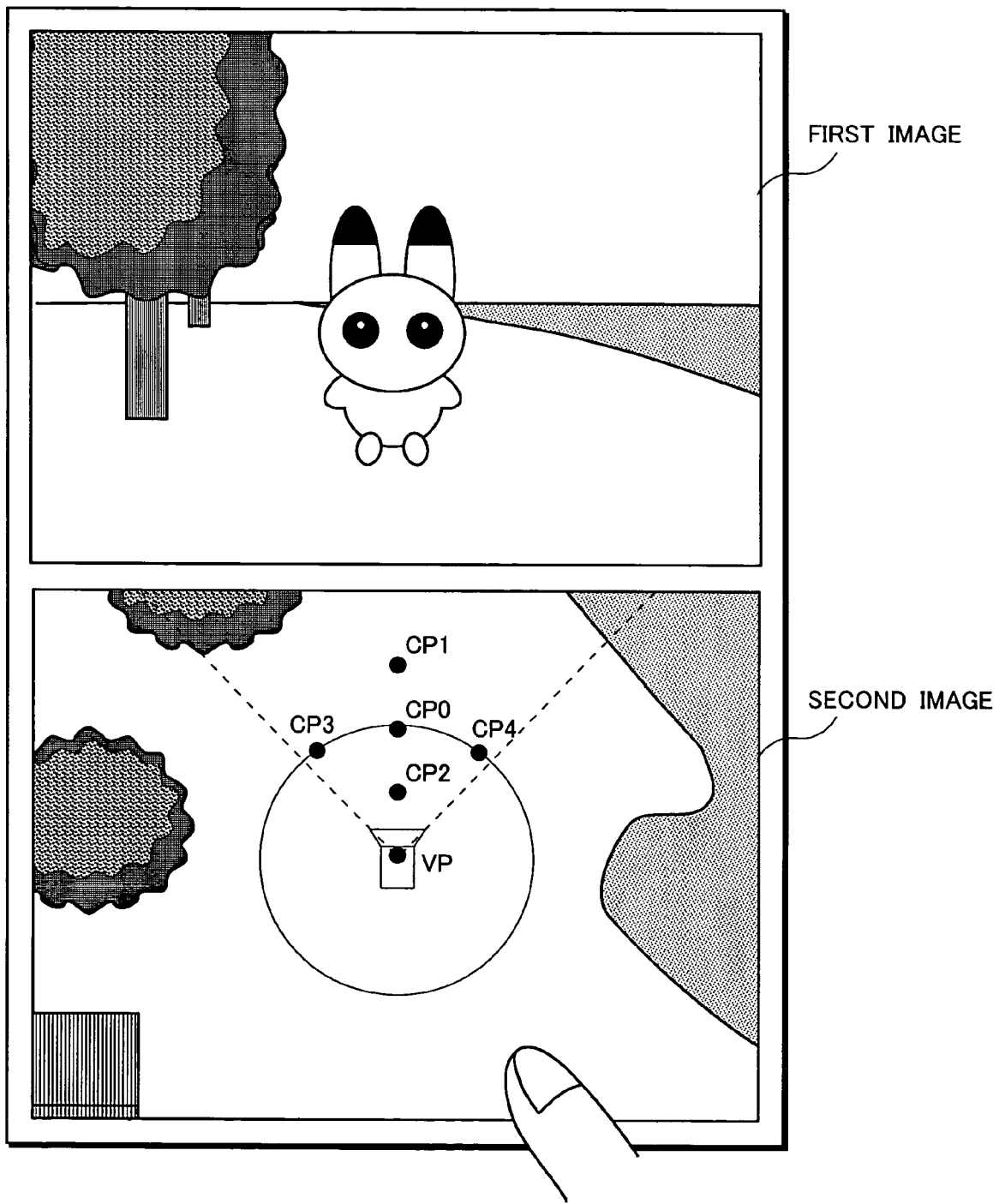
FIG. 23 is an illustration showing an example of a position of contact with a touch panel.
Figure 24:
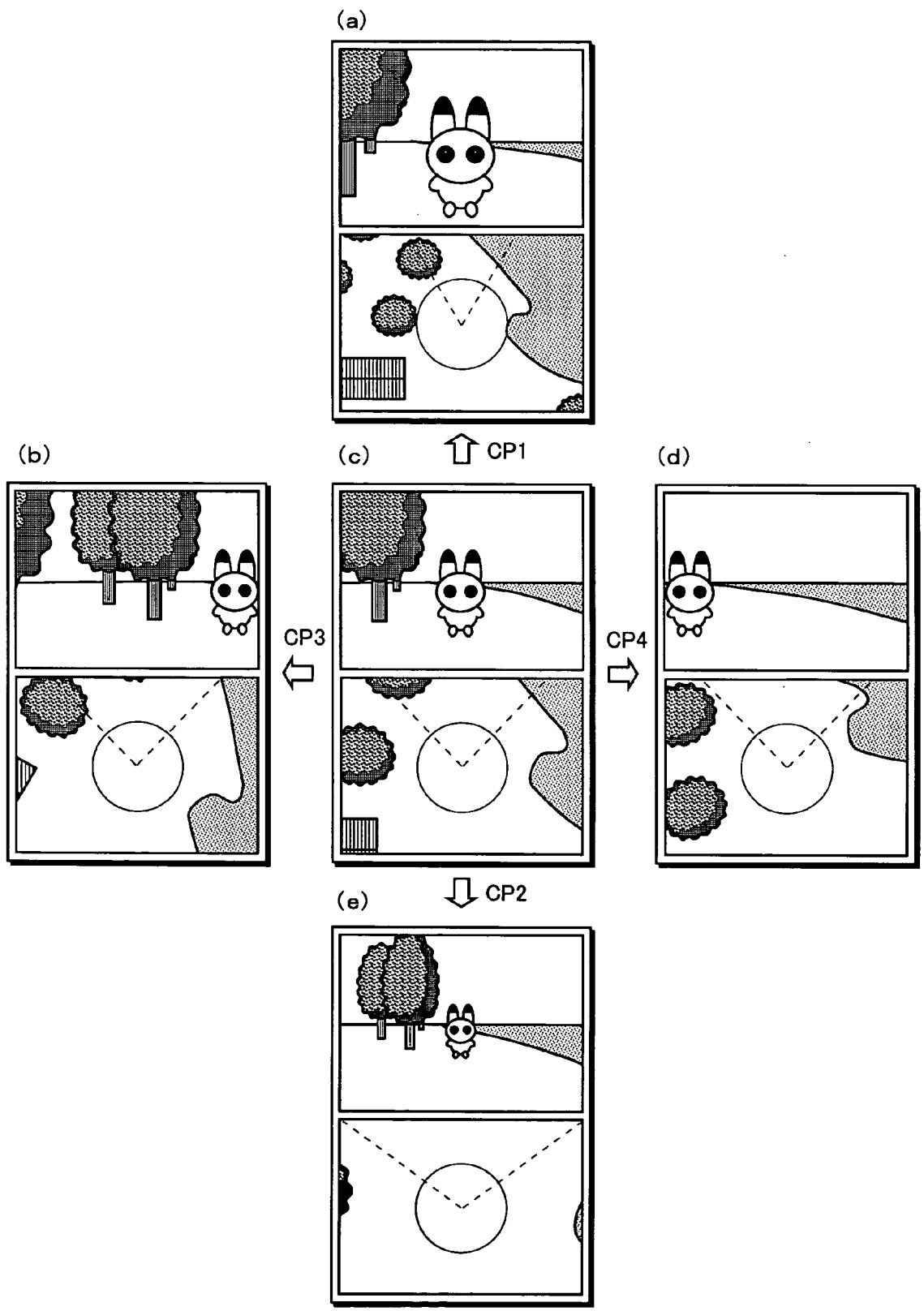
FIG. 24 is an illustration showing exemplary changes of the first image and the second image according to the position of contact with the touch panel.

As shown in FIG. 1, the second LCD 12 is provided thereon with the touch panel 16. By touching the touch panel 16, the player can arbitrarily set a focus point of the virtual camera. For example, with an image shown in FIG. 23 or (c) of FIG. 24 being displayed on the first LCD 11 and the second LCD 12, when the player touches a point CP1 on the touch panel 16 with a finger or the stick 17, the orientation of the virtual camera is not changed, but the zoom scaling is gradually increased. That is, the first image is gradually zoomed up. This change is shown in (a) of FIG. 24, for example. At this time, the second image is also changed, which will be described further below in detail. Similarly, when the player touches a point CP2 on the touch panel 16, the orientation of the virtual camera is not changed, but the zoom scaling is gradually decreased. That is, the first image is zoomed down. This change is shown in (e) of FIG. 24, for example. Also, when the player touches a point CP3 on the touch panel 16, the zoom scaling is not changed, but the orientation of the virtual camera is gradually changed in the leftward direction with reference to the current direction of the line of sight. This change is shown in (b) of FIG. 24. Also, when the player touches a point CP4, the zoom scaling is not changed, but the orientation of the virtual camera is gradually changed in the rightward direction with reference to the current direction of the line of sight. This change is shown in (d) of FIG. 24. When the player touches a point CP0 on the touch panel 16, the first image is left unchanged as shown in (c) of FIG. 24. That is, FIG. 23 shows the first image and the second image when the focus point of the virtual camera is set at a point that is in the virtual game space and corresponds to the point CP0 on the touch panel 16. Here, CP1 and CP2 are on a straight line connecting VP and CP0, with CP1 being away from VP more than CP0 and with CP2 being closer to VP than CP0. CP3 and CP4 are on a perimeter of a circle passing through CP0 and centering at VP. CP3 is located to the left of CP0 with reference to the current direction of the line of sight, while CP4 is located to the right thereof.

Figure 25:
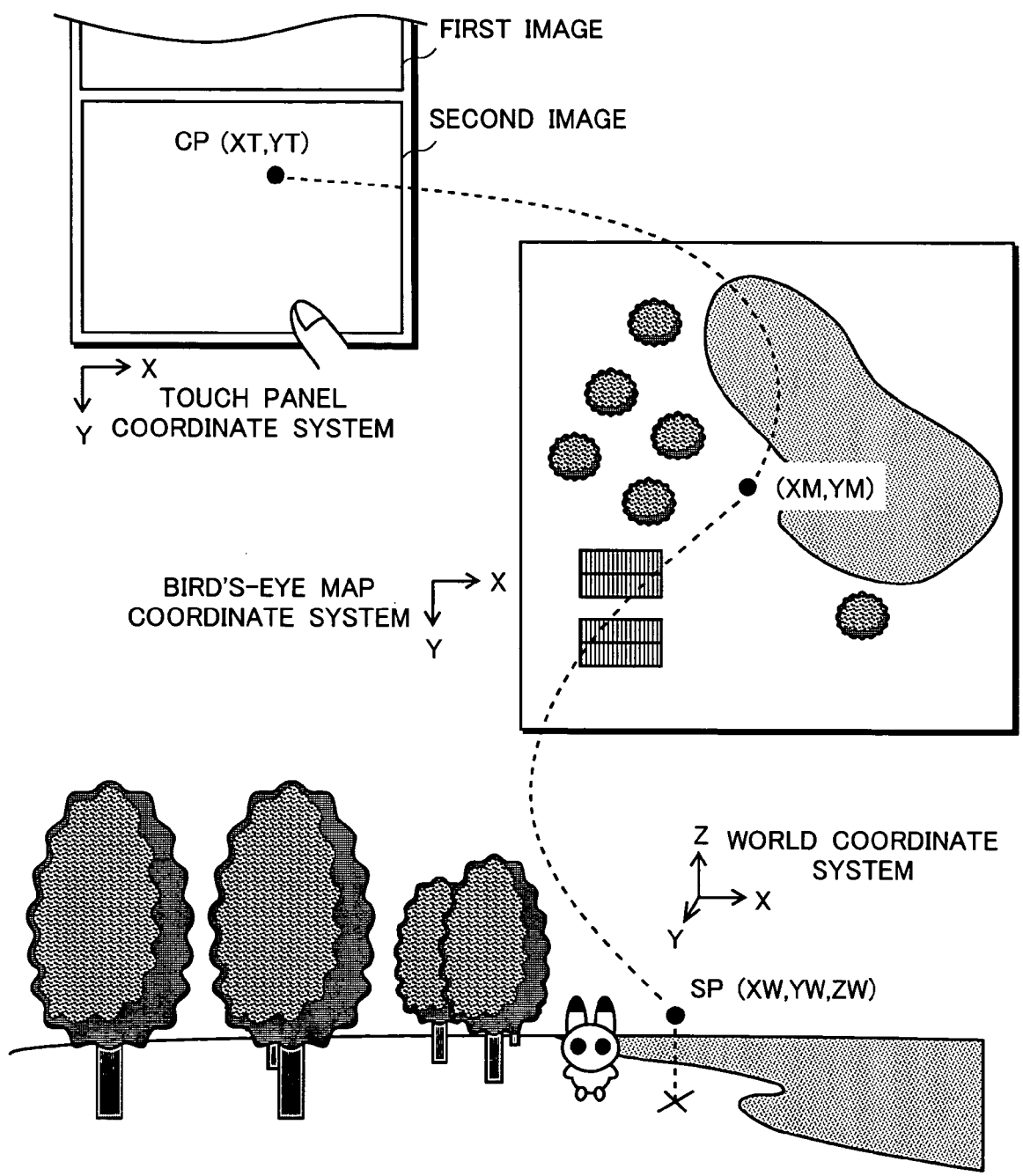
FIG. 25 is an illustration showing a correspondence between the position of contact with the touch panel and a focus point in a virtual game space.

With reference to FIG. 25, description is made to a manner of determining a focus point in the virtual game machine based on an input from the touch panel 16. When the player touches the touch panel 16 with a finger or the stick 17, coordinates (XT, YT) in a touch panel coordinate system corresponding to a touched position CP are detected. Next, these coordinates (XT, YT) are transformed to coordinates (XM, YM) in a bird's eye coordinate system. Then, these coordinates (XM,YM) are further transformed to coordinates (XW, YW, ZW) in a world coordinate system. The coordinates (XW, YW, ZW) eventually obtained in the above manner are set as coordinates of a focus point SP of the virtual camera in the virtual game space. Here, in the present embodiment, an X axis and a Y axis are commonly used between the bird's-eye map coordinate system and the world coordinate system, and a Z coordinate of the focus point SP is taken as a fixed value $\alpha$. With this, the coordinates in the world coordinate system corresponding to the coordinates (XM, YM) in the bird's-eye map coordinate system are (XM, YM, $\alpha$), thereby making it easier to convert the bird's-eye map coordinate system to the world coordinate system. Note that the Z coordinate of the target point SP is not restricted to a fixed value, but may be determined according to another rule. For example, the Z coordinate may be determined in accordance with undulations of the ground in the virtual game space. Also, the Z coordinate may be changed in accordance with an operation switch input from the player.

Figure 26A:
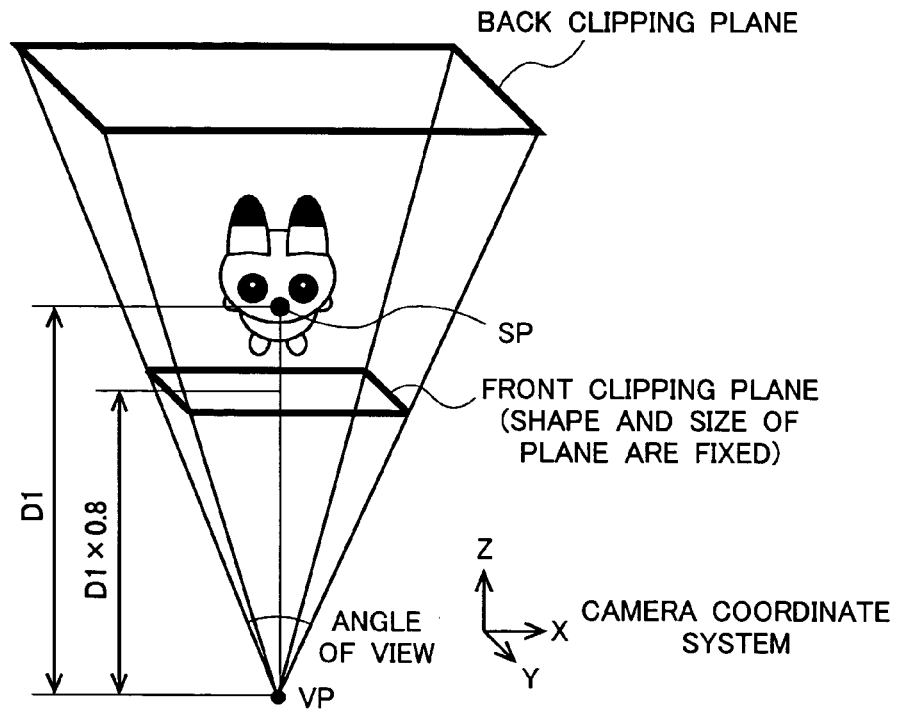
FIGS. 26A and 26B are illustrations showing details of a zoom process of a virtual camera.
Figure 26B:
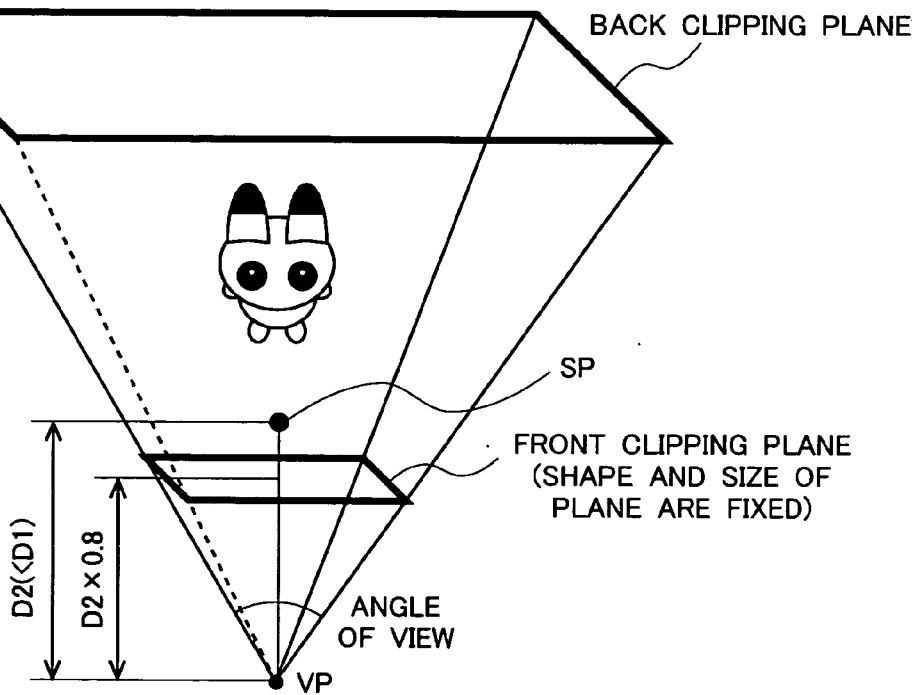

Next, with reference to FIG. 26, a scheme of generating a first image is described. When the focus point SP is specified by the player through the touch panel 16, the orientation of the virtual camera (the direction of the line of sight) is determined so as to be oriented from the view point VP to the focus point SP. Furthermore, a zoom of the virtual camera is set in accordance with a distance from the view point VP to the focus point SP. A zoom controlling scheme is more specifically described below. When the distance between the view point VP to the focus point SP is D, a front clipping plane is set at a position D×0.8 away from the view point VP, for example. Here, the shape and size of the front clipping plane are assumed to be fixed. That is, since the position of the front clipping plane is changed with the distance D and the shape and size of the front clipping plane are fixed, the angle of view of the virtual camera is changed in accordance with the distance D. That is, as shown in FIGS. 26A and 26B, as the distance from the view point VP to the focus point SP is longer, the angle of view is smaller (that is, the zoom scaling of the virtual camera is increased). Conversely, as the distance from the view point VP to the focus point SP is shorter, the angle of view is larger (that is, the zoom scaling of the virtual camera is decreased). As such, the zoom is controlled by changing the angle of view in accordance with the distance from the view point VP to the focus point SP. With such a zoom control, objects, and the like, near the focus point SP, can be displayed so as to each have a stable size. The player can clearly ascertain the state at a point and its surroundings by specifying that point on the touch panel.

Figure 27:
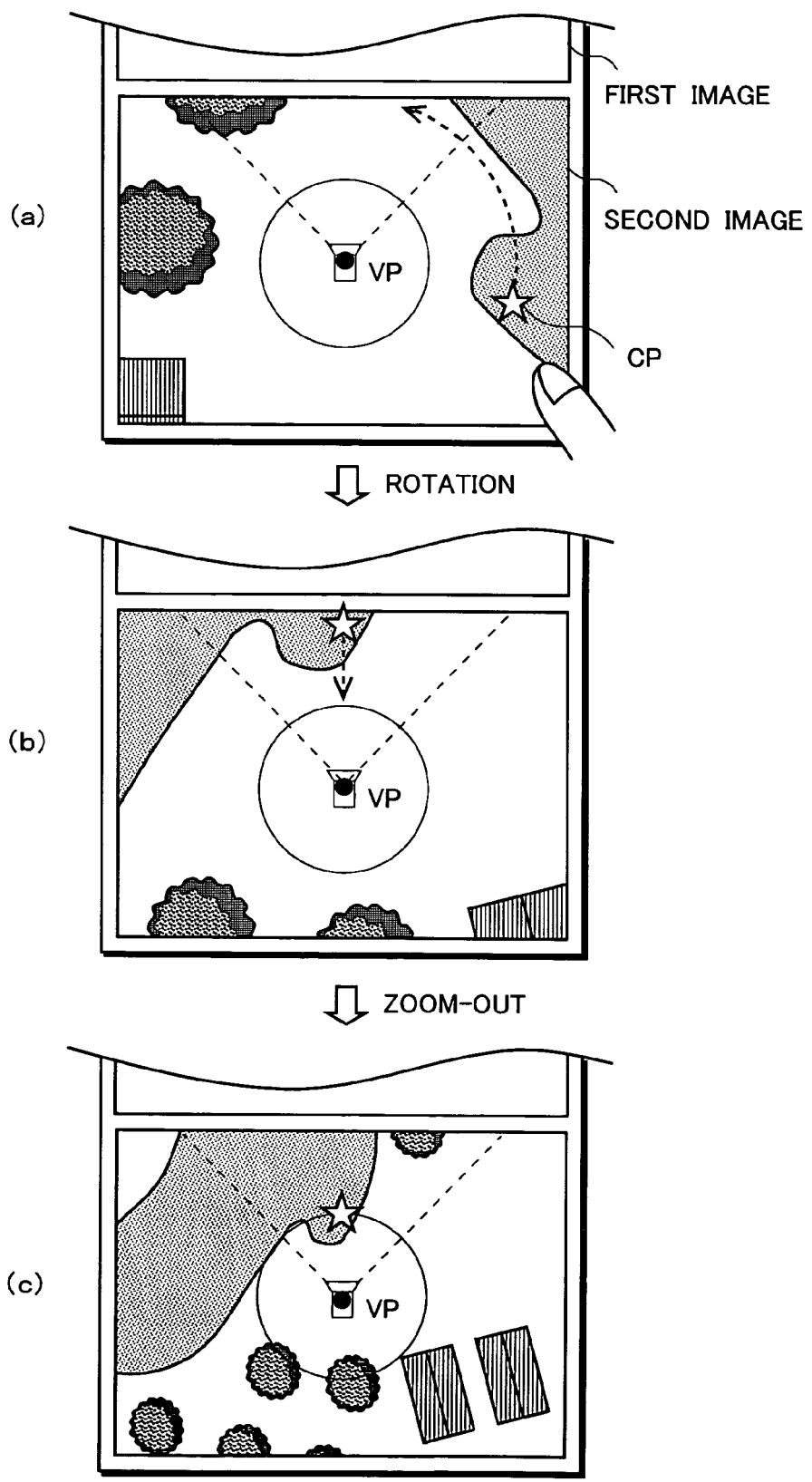
FIG. 27 is an illustration showing a rotating process and a zoom-out process to be performed on a bird's-eye view.

Next, with reference to FIG. 27, a scheme of generating a second image is described. In the present embodiment, a point on the bird's-eye map corresponding to the view point VP and a point thereon corresponding to the focus point SP are displayed on the second LCD 12 at always fixed positions. For example, when the player touches a point CP on a second image displayed as shown in (a) of FIG. 27 with a finger, the bird's-eye map is rotated with reference to the view point VP (refer to (b) of FIG. 27) so that a direction connecting the point on the bird's-eye map corresponding to the view point VP and the point (marked with a star) thereon corresponding to the focus point SP coincides with the Y axis direction (negative direction) in the touch panel coordinate system shown in FIG. 25. Furthermore, the bird's-eye map is reduced with reference to the view point VP (refer to (c) of FIG. 27) so that the distance on the second LCD 12 between the point on the bird's-eye map, corresponding to the view point VP, and the point (marked with a star) thereon, corresponding to the focus point SP, is equal to a predetermined distance (a radius of the circle of the second LCD 12). As a result, the point on the bird's-eye map, corresponding to the focus point SP specified by the player, is always displayed at a predetermined point on the second LCD (a point CP0 in FIG. 23), resultantly causing the bird's-eye map to be displayed as being reduced, when the view point VP and the focus point SP are distanced apart. Thus, by viewing the second LCD 12, the player can ascertain both the state near the view point VP and the state near the focus point SP.

In this way, the point on the bird's-eye map corresponding to the view point VP and the point thereon corresponding to the focus point SP are always displayed at fixed positions on the second LCD 12. Therefore, every time the player taps a predetermined point (for example, a point CP4 in FIG. 23) with a finger, the orientation of the virtual camera can be rotated by a predetermined angle (for example, 30 degrees), thereby improving the operability. Also, in order to shift the orientation of the virtual camera to the right while viewing the first image, the player simply touches the right side of the point CP0 (fixed) on the second LCD 12 with a finger even without viewing the second image, thereby expediently saving the player from having to view the second image. Furthermore, a horizontal direction of the virtual camera in the second LCD 12 coincides with a horizontal direction of the virtual camera in the first LCD 11. That is, when the player touches the right half of the second image, the virtual camera rotates rightward, and when the player touches the left half of the second image, the virtual camera rotates leftward. Therefore, the player can intuitively control the orientation of the virtual camera. That is, in order to ascertain the state on a further right side in the virtual game space displayed on the first LCD 11, the player only touches the right area on the second LCD 12 with a finger.

Furthermore, the second image shown in (b) of FIG. 27 may not actually been displayed on the second LCD 12. Also, in this example, the bird's-eye map is zoomed out after being rotated. Alternatively, the bird's-eye map may be rotated after being zoomed out or may be rotated and zoomed out at the same time.

Still further, when a point inside of the circle shown in (a) of FIG. 27 is touched with a finger, the bird's-eye map is zoomed in with reference to the view point VP so that the distance between the point on the bird's-eye map corresponding to the view point VP and the point thereon corresponding to the focus point SP is equal to a predetermined distance. With this, the bird's-eye map is zoomed in for display when the view point VP and the focus point SP are close to each other, thereby allowing the player to easily adjust the position of the focus point SP.

Figure 28:
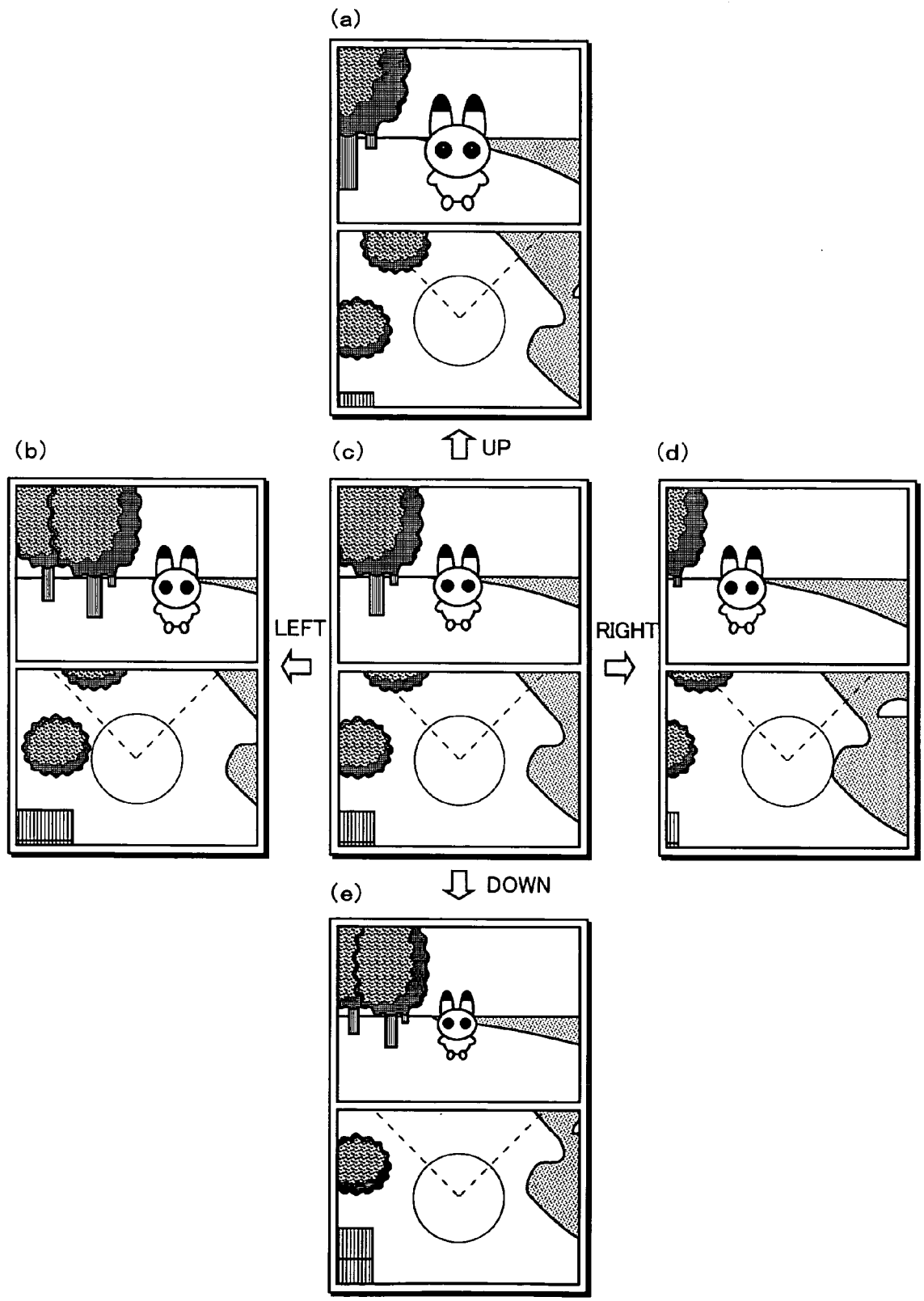
FIG. 28 is an illustration showing an exemplary change of the first image and the second image in accordance with the movement of the view point.

Still further, in the present embodiment, the player operates the cross key to move the position of the virtual camera (that is, the view point VP) in the virtual game space. Also, the view point VP may be automatically moved based on a predetermined algorithm. When the view point VP is moved, the bird's-eye map displayed on the second LCD 12 is changed accordingly. Illustrated in (a) of FIG. 28 is a state after the first image and the second image have been changed with the player pressing the upper portion of the cross key in the state shown in (c) of FIG. 28. Also illustrated in (b) of FIG. 28 is a state after the first image and the second image have been changed with the player pressing the left portion of the cross key in the state shown in (c) of FIG. 28. Similarly, illustrated in (d) of FIG. 28 is a state after the first image and the second image have been changed with the player pressing the right portion of the cross key in the state shown in (c) of FIG. 28. Illustrated in (e) of FIG. 28 is a state after the first image and the second image have been changed with the player pressing the lower portion of the cross key in the state shown in (c) of FIG. 28. As evident with reference to FIG. 28, in accordance with the movement of the view point VP, the first image becomes an image representing the virtual game space viewed from the moved view point VP, while the second image becomes an image representing a predetermined area with the moved view point VP being taken as the center. Note that the focus point SP is moved by an amount equal to the amount of movement of the view point VP in a direction identical to the direction in which the view point VP is moved.

As described above, the player can arbitrarily determine the position of the view point and the position of the focus point to cause a desired monster to be displayed on the first LCD 11. Furthermore, by pressing the A button, the player can take a photograph of the monster. The photograph taken in this manner (that is, the first image displayed on the first LCD 11 when the player presses the A button) is evaluated based on a predetermined criteria (for example, whether the monster is displayed approximately at the center of the photograph), and then the evaluation results are stored in the RAM 37.

Figure 29:
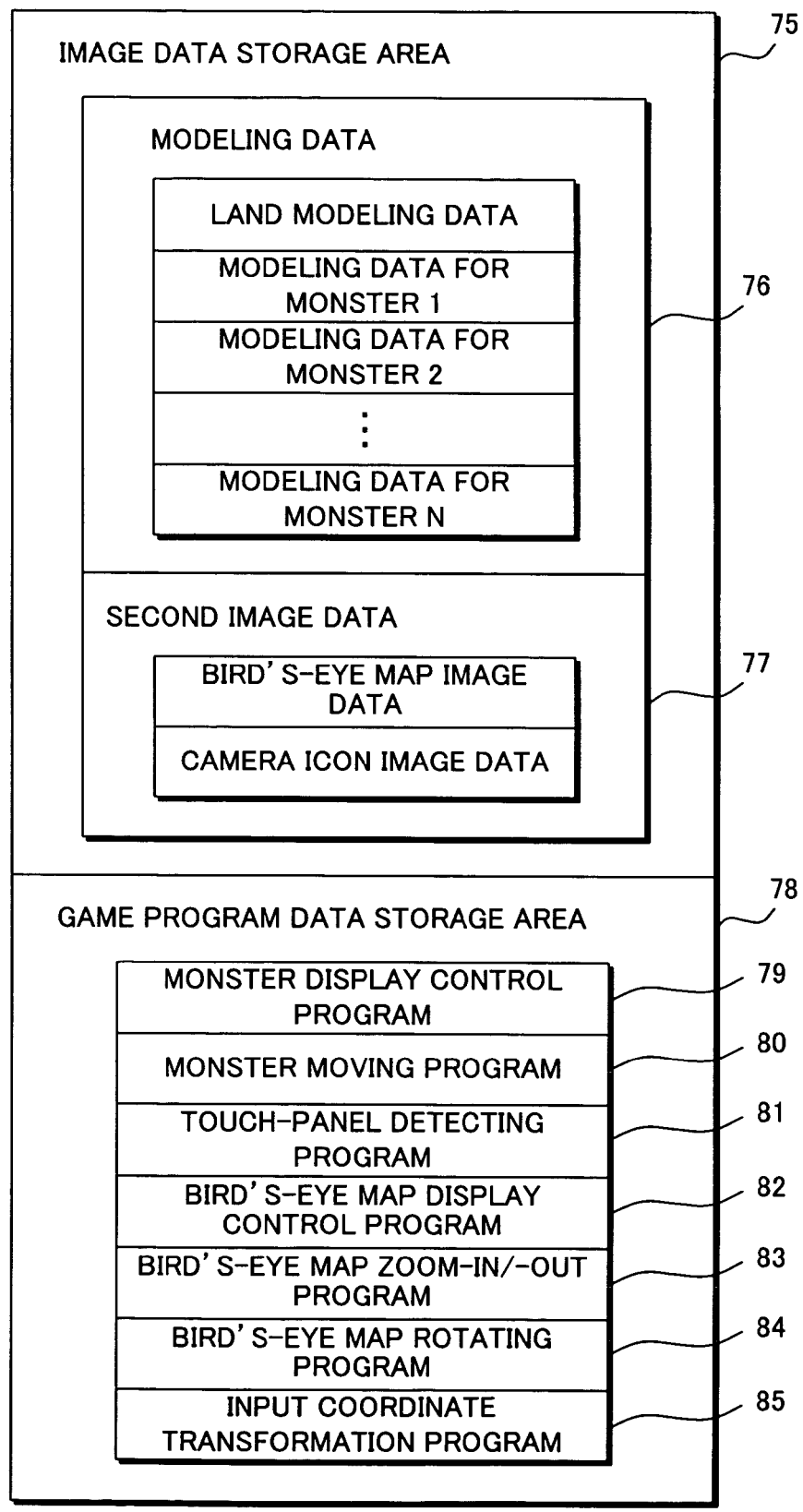
FIG. 29 is a memory map of a ROM 180 in the second embodiment.

FIG. 29 is a memory map of the ROM 180.

In FIG. 29, an image data storage area 75 has stored therein modeling data 76 for forming a virtual game space and second image data 77 for generating a second image to be displayed on the second LCD 12. The modeling data includes modeling data for forming terrains in the virtual game space and modeling data for forming each monster that is present in the virtual game space. The second image data 77 includes image data representing a bird's-eye map and image data representing a camera icon to be displayed so as to overlap with the bird's-eye map.

A game program data storage area 78 has stored therein a monster display control program 79 for causing monsters to be displayed in the virtual game space, a monster moving program 80 for moving monsters, a touch-panel detecting program 81 for detecting coordinate data indicative of a point of contact of the touch panel 16 with the finger or the stick 17, a bird's-eye map display control program 82 for causing the bird's-eye map to be displayed on the second LCD 12, a bird's-eye map zooming-in/-out program 83 for zooming in or out the bird's-eye map, a bird's-eye map rotating program 84 for rotating the bird's-eye map, and an input coordinate transformation program 85 for transforming the coordinate data in the touch-panel coordinate system to coordinate data in the world coordinate system (FIG. 25).

Figure 30:
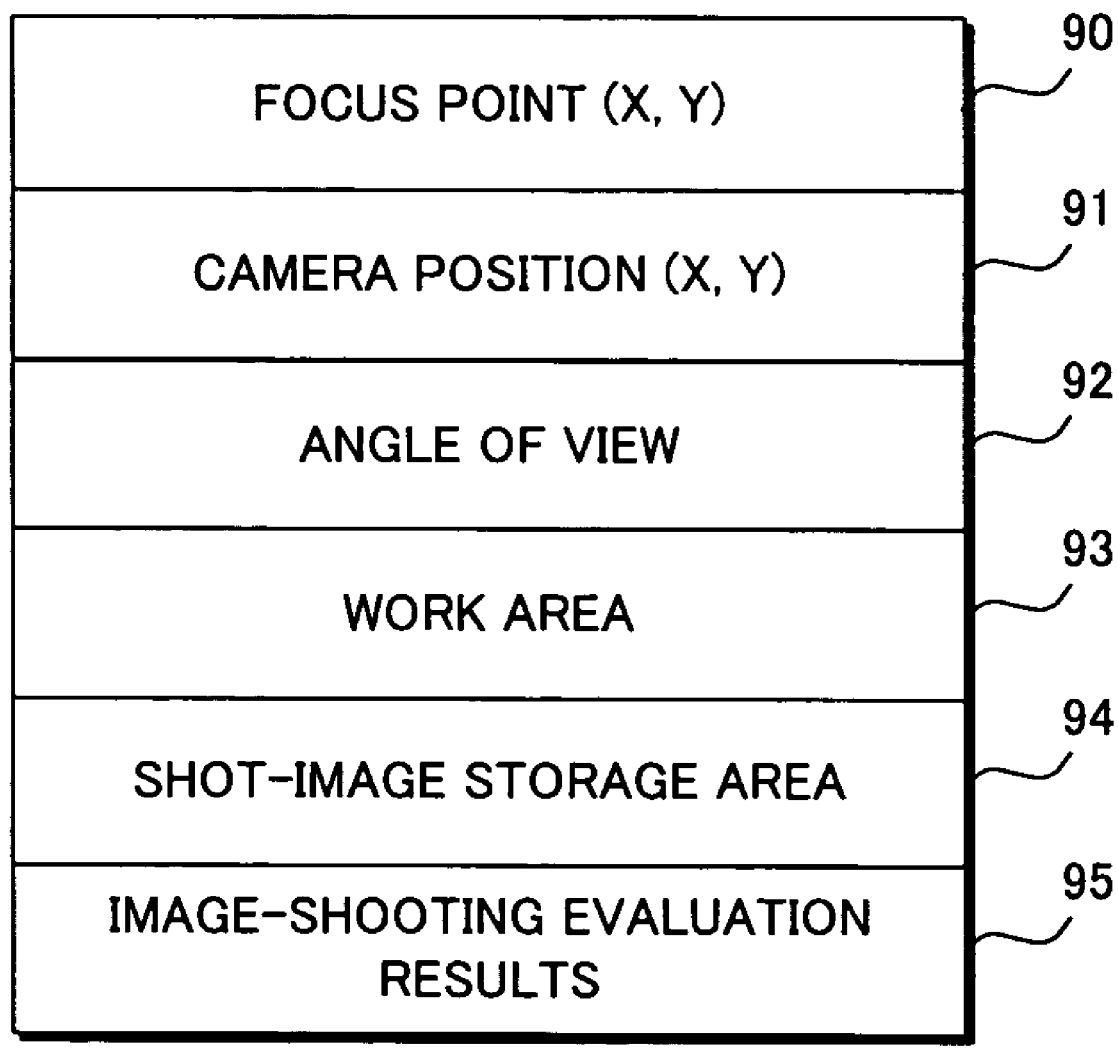
FIG. 30 is a memory map of a RAM 37 in the second embodiment.

FIG. 30 is a memory map of the RAM 37.

In FIG. 30, the RAM 37 has stored therein the coordinates of the focus point in the virtual game space, coordinates 91 of a view point (that is, a position of the virtual camera), an angle of view 92 of the virtual camera, etc. Here, in the present embodiment, it is assumed that a Z coordinate of the focus point and a Z coordinate of the view point are fixed (10, for example). Therefore, these Z coordinates of the focus point and the view point do not have to be stored in the RAM 37. Also, the RAM 37 is provided with a working area 93 and an area 94 for storing an image shot in the virtual game space. Furthermore, the RAM 37 has stored therein, as image-shooting results 95, evaluation results of images shot by the player.

Next, with reference to flowcharts in FIGS. 31 and 32, a flow of a game process based on the game program and the game data is described below.

Figure 31:
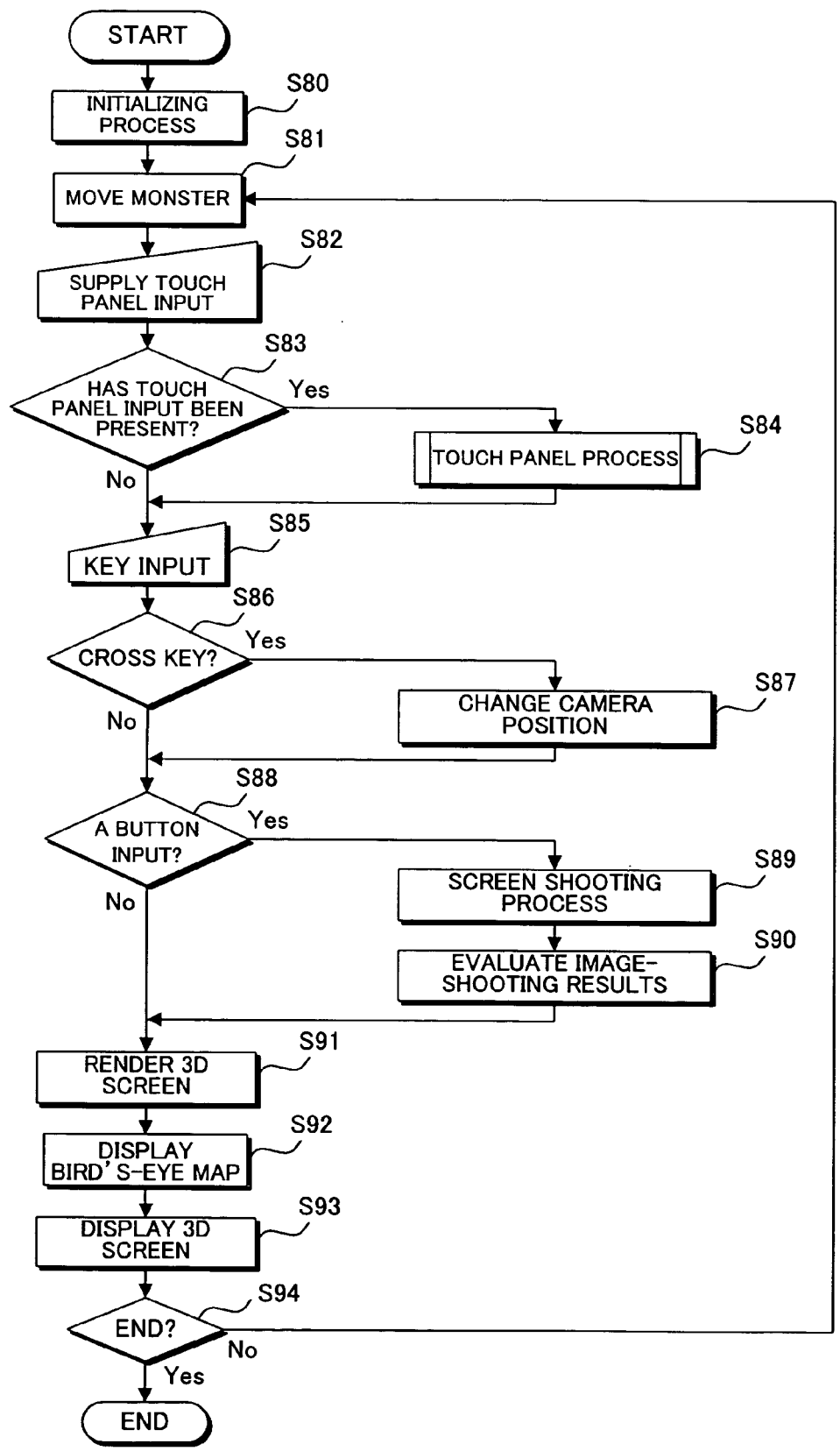
FIG. 31 is a flowchart showing a flow of a game process.

In FIG. 31, when the game is started, the CPU core 31 first performs an initializing process (S80), and then performs a process of moving a monster in the virtual game space.

Next, the CPU core 31 accepts an input from the touch panel 16 (S82), and then determines whether an input from the touch panel 16 is present (S83). If an input from the touch panel 16 is present, the CPU core 31 performs a touch panel process (S84). With reference to FIG. 32, this touch panel process is described below.

Figure 32:
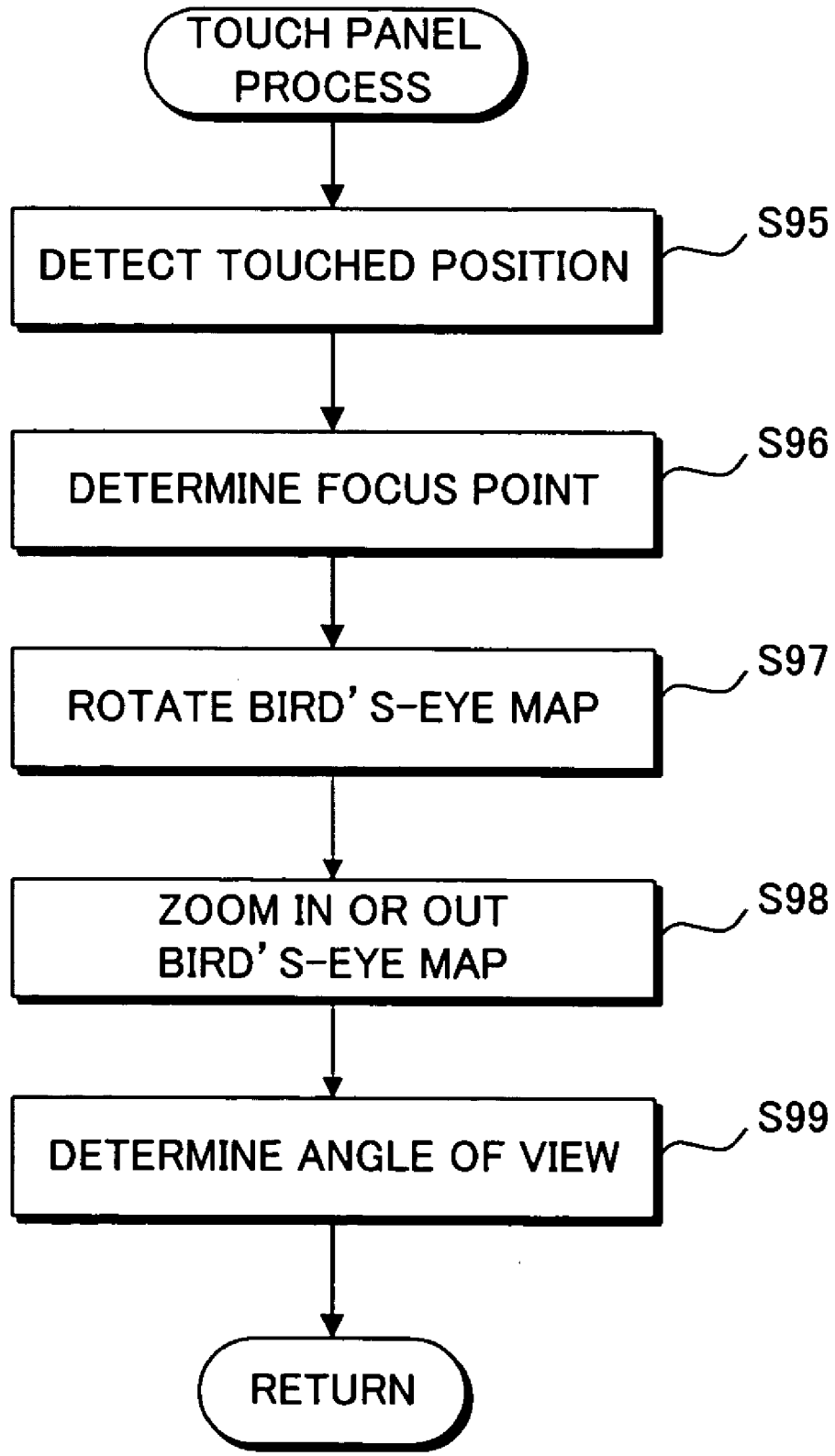
FIG. 32 is a flowchart showing a flow of a touch panel process.

In FIG. 32, the CPU core 31 detects coordinate data indicative of a point of contact of a finger or the stick 17 with the touch panel 16 (S95). Based on the detected coordinate data, coordinates of the focus point in the virtual game space are then determined through coordinate transformation shown in FIG. 25 (S96). Next, the bird's-eye map is rotated so that the direction connecting the point on the bird's-eye map corresponding to the view point VP and the point thereon corresponding to the focus point SP coincides with the Y axis direction in the touch panel coordinate system shown in FIG. 25 (S97). Furthermore, the bird's-eye map is zoomed in or out so that the distance on the second LCD 12 between the point on the bird's-eye map corresponding to the view point VP and the point thereon corresponding to the focus point SP is equal to a predetermined distance (S98). Furthermore, the CPU core 31 determines an angle of view of the virtual camera based on the coordinates of the focus point and the position of the virtual camera, and then stores the angle of view in the RAM 37 (S99).

In FIG. 31, the CPU core 31 accepts a key input, that is, an input from the operation switch unit 15 (the cross key, the A button, etc.) (S85). Then, the CPU core 31 determines whether the cross key has been pressed (S86). If the cross key has been pressed, the view point (that is, the position of the virtual camera) is moved in accordance with the pressed portion of the cross key (up, down, left, or right), and also the position of the focus point is moved (S87). The CPU core 31 then determines whether the A button (shooting button) has been pressed (S88). If the A button has been pressed, data of the first image displayed at that moment on the first LCD 11 is stored in the shot-image storage area 94 of the RAM 37 as shot-image data (S89). Furthermore, based on the shot-image data, image-shooting results are evaluated, and then the evaluation results are stored in the RAM 37 as image-shooting evaluation results 95 (S90).

Next, based on the view point, the coordinates of the focus point, and the angle of view, the CPU core 31 generates a three-dimensional image representing a state of the virtual game space viewed from the virtual camera (S91). Then, a second image including a bird's-eye map is generated and displayed on the second LCD 12 (S92). Also, the three-dimensional image generated in step S91 is displayed on the first LCD 11 as a first image (S93).

The CPU core 31 then determines whether the game has ended. If the game has ended, the procedure ends. If the game continues, the procedure returns to step S81.

As described above, according to the present embodiment the player can instantaneously change the direction of the line of sight (the direction of the focus of the virtual camera) to an arbitrary direction. Also, with the bird's-eye map displayed on the second LCD 12, the player can always ascertain the state of the surroundings of the view point (virtual camera) in the virtual game space, thereby achieving intuitive and stress-free game play.

In the present embodiment, the touch panel 16 is used as an input unit for specifying the focus point. This is not meant to be restrictive in the present invention. Alternatively, for example, the focus point may be specified by moving a cursor displayed on the second LCD 12 with the cross key or the like to an arbitrary position, and then pressing the A button.

Also, as with the first embodiment, the present embodiment can also be applied to the game machine and the game system as shown in FIGS. 17 through 20.

While the invention has been described in detail, the foregoing description is in all aspects illustrative and not restrictive. It is understood that numerous other modifications and variations can be devised without departing from the scope of the invention.

What is claimed is:

1. A game machine provided with a first display unit and a second display unit to cause a game to proceed in a virtual game space, the game machine comprising:
    an input unit to be operated by a player;
    a first display controller which generates a first image representing a scene captured by a virtual camera provided in the virtual game space and causes the first image to be displayed on the first display unit;
    a second display controller which generates a second image for allowing the player to specify a desired focus target in a virtual game space and causes the second image to be displayed on the second display unit;
    a focus target determining mechanism which determines the focus target based on an input from the input unit; and
    a virtual camera controller which directs the virtual camera to capture another scene in the virtual game space having the focus target determined by the focus target determining mechanism, wherein the first display controller generates a third image representing the another scene to be displayed on the first display unit,
    wherein the first display controller causes the third image which is displayed on the first display unit, and
    wherein a plurality of objects are present in the virtual game space, and the game machine further comprises feature information storage locations which store feature information unique to each of the plurality of objects, and
    based on an operation performed by a player on the input unit, the focus target determining mechanism determines one of the plurality of objects as a focus target object,
    the second display controller generates the second image including the feature information corresponding to the focus target object,
    the virtual camera controller sets a focus point of the virtual camera at the focus target object, and
    the first display controller generates the first image from which an image for distinguishing the focus target object from other objects is excluded.

2. The game machine according to claim 1, wherein
    a plurality of objects are present in the virtual game space,
    the game machine further comprises feature information storage locations which store feature information unique to each of the plurality of objects,
    based on an operation performed by a player on the input unit, the focus target determining mechanism determines one of the plurality of objects as a focus target object,
    the second display controller generates the second image including the feature information corresponding to the focus target object, and
    the virtual camera controller sets a focus point of the virtual camera at the focus target object.

3. The game machine according to claim 2, further comprising a feature information selecting mechanism which selects one piece of the feature information of the plurality of objects as selected feature information in accordance with an operation performed by the player on the input unit, wherein
    the focus target determining mechanism determines an object corresponding to the selected feature information as the focus target object, and the second display controller generates the second image including an image for distinguishing the selected feature information from other pieces of feature information.

4. The game machine according to claim 2, wherein
the second display controller generates the second image including at least one command for changing the objects, and
the game machine further comprises: command selecting means which selects one of the commands in accordance with an operation performed by the player on the input unit; and object changing mechanism which changes the focus target object according to the selected command.

5. The game machine according to claim 4, further comprising:
state storage locations which store a state of the focus target object; and state changing mechanism which changes the state of the focus target object, wherein whether the command is selectable depends on a current state of the focus target object, and
the second display controller generates the second image which allows the player to ascertain which command is currently selectable.

6. The game machine according to claim 2, further comprising:
state storage locations which store a state of the focus target object; and
a state changing mechanism which changes the state of the focus target object, wherein
the second display controller generates the second image including information indicative of a current state of the focus target object.

7. The game machine according to claim 2, wherein
the virtual camera controller changes either one of a position of the virtual camera and a zoom scaling in accordance with an operation performed by the player on the input unit or when a game state enters a predetermined state, and sets a focus point of the virtual camera to the focus target object irrespective of the change.

8. The game machine according to claim 2, further comprising a portrait image generator which generates a portrait image of the objects through rendering, wherein
the second display controller generates the second image including the portrait image as the feature information.

9. The game machine according to claim 1, wherein the virtual game space is a three-dimensional virtual game space,
the second display controller generates the second image including a two-dimensional map corresponding to the virtual game space,
the game machine further comprises a coordinate detecting mechanism which detects, based on an input from the input unit, coordinates indicative of a position specified by the player on the second display unit,
based on the coordinates detected by the coordinate detecting mechanism, the focus target determining mechanism determines a point in the virtual game space corresponding to the position specified by the player on the second display unit as a focus target point, and
the virtual camera controller sets the focus point of the virtual camera at the focus target point.

10. The game machine according to claim 9, further comprising a distance calculator which calculates a distance from a position of the virtual camera to the focus target point in the virtual game space, wherein the virtual camera controller sets an angle of view of the virtual camera so that the angle of view is decreased as the distance calculated by the distance calculator is longer.

11. The game machine according to claim 10, wherein
the virtual camera controller sets a vertical angle of an isosceles triangle as the angle of view of the virtual camera, the isosceles triangle having a base of a fixed length and a height being changed in proportion to the distance calculated by the distance calculator.

12. The game machine according to claim 9, wherein of three coordinates for specifying a position of the focus target point, the focus target determining mechanism determines two of the coordinates based on the coordinates detected by the coordinate detecting mechanism and another one of the coordinates based on a predetermined rule.

13. The game machine according to claim 9, wherein the virtual camera controller moves a position of the virtual camera in accordance with an operation performed by the player on the input unit or in an automatic manner, and
the second display controller generates the second image having displayed therein an area in a predetermined range on the two-dimensional map, which corresponds to an entirety of the virtual game space, with reference to a point corresponding to the position of the virtual camera.

14. The game machine according to claim 9, wherein the second display controller generates the second image by rotating the two-dimensional map so that, on the second display unit, a direction connecting a point on the two-dimensional map corresponding to a position of the virtual camera and a point on the two-dimensional map corresponding to the focus target point is a predetermined direction on the second display unit.

15. The game machine according to claim 9, wherein the first display unit and the second display unit are relatively fixed in position, and
the second display controller generates the second image by rotating the two-dimensional map so that, on the second display unit, a direction connecting a point on the two-dimensional map corresponding to the focus target point and a point on the two-dimensional map corresponding to a position of the virtual camera is perpendicular to a horizontal direction of the virtual camera in the first display unit.

16. The game machine according to claim 9, wherein the second display unit is shaped as a rectangle, and
the second display controller generates the second image by rotating the two-dimensional map so that, on the second display unit, a direction connecting a point on the two-dimensional map corresponding to the focus target point and a point on the two-dimensional map corresponding to a position of the virtual camera coincides with a vertical side of the rectangle of the second display unit.

17. The game machine according to claim 9, wherein the second display controller generates the second image by zooming in or out of the two-dimensional map so that a distance on the second display unit between a point on the two-dimensional map corresponding to the focus target point and a point on the two-dimensional map corresponding to a position of the virtual camera is a predetermined distance.

18. The game machine according to claim 9, further comprising:
a photographic object controller which disposes a photographic object moving in the virtual game space with a predetermined algorithm;

an evaluation target image storage locations which store the first image generated by the first display controller as an evaluation target image in accordance with a specific operation performed by the player on the input unit; and an evaluating mechanism which evaluates the evaluation target image based on a state of disposition of the photographic object in the evaluation target image.

19. The game machine according to claim 9, wherein as the input unit, at least a touch panel is provided on the second display unit.

20. A computer-readable storage medium having stored therein a game program for causing a computer connected to a first display unit, a second display unit, and an input unit to be operated by a player to implement a game in a virtual game space, the game program causing the computer to function as:

a first display controller which generates a first image representing a scene captured by a virtual camera provided in the virtual game space and causes the first image to be displayed on the first display unit;

a second display controller which generates a second image for allowing the player to specify a desired focus target in a virtual game space and causes the second image to be displayed on the second display unit;

a focus target determining mechanism which determines the focus target based on an input from the input unit;

a virtual camera controller which directs the virtual camera to capture another scene in the virtual game space having the focus target determined by the focus target determining means, wherein the first display controller generates a third image representing the another scene which is displayed on the first display unit, wherein a plurality of objects are present in the virtual game space, and the game program further causes the computer to:

function as feature information storage location device which stores feature information unique to each of the plurality of objects, and based on an operation performed by a player on the input unit, the focus target determining mechanism determines one of the plurality of objects as a focus target object, the second display controller generates the second image including the feature information corresponding to the focus target object, the virtual camera controller sets a focus point of the virtual camera at the focus target object, and wherein the first display controller generates the first image from which an image for distinguishing the focus target object from other objects is excluded.

21. The storage medium according to claim 20, wherein the game program further causes the computer to function as feature information selecting mechanism which selects one piece of the feature information of the plurality of objects as selected feature information in accordance with an operation performed by the player on the input unit, the focus target determining mechanism determines an object corresponding to the selected feature information as the focus target object, and the second display controller generates the second image including an image for distinguishing the selected feature information from other pieces of feature information.

22. The storage medium according to claim 20, wherein the second display controller generates the second image including at least one command for changing the objects, and the game program further causes the computer to function as: command selecting mechanism which selects one of the commands in accordance with an operation performed by the player on the input unit; and object changing mechanism which changes the focus target object.

23. The storage medium according to claim 22, wherein the game program further causes the computer to function as: state storage locations which store a state of the focus target object; and state changing mechanism which changes the state of the focus target object, whether the command is selectable depends on a current state of the focus target object, and the second display controller generates the second image which allows the player to ascertain which command is currently selectable.

24. The storage medium according to claim 20, wherein the game program further causes the computer to function as: state storage locations which store a state of the focus target object; and a state changing mechanism which changes the state of the focus target object, and the second display controller generates the second image including information indicative of a current state of the focus target object.

25. The storage medium according to claim 20, wherein the virtual camera controller changes either one of a position of the virtual camera and a zoom scaling in accordance with an operation performed by the player on the input unit or when a game state becomes a predetermined state, and sets a focus point of the virtual camera to the focus target object irrespective of the change.

26. The storage medium according to claim 20, wherein the game program further causes the computer to function as portrait image generator which generates a portrait image of the objects through rendering, and the second display controller generates the second image including the portrait image as the feature information.

27. The storage medium according to claim 20, wherein the virtual game space is a three-dimensional virtual game space, the second display controller generates the second image including a two-dimensional map corresponding to the virtual game space, the game program further causes the computer to function as coordinate detecting mechanism which detects, based on an input from the input unit, coordinates indicative of a position specified by the player on the second display unit, based on the coordinates detected by the coordinate detecting mechanism, the focus target determining mechanism determines a point in the virtual game space corresponding to the position specified by the player on the second display unit as a focus target point, and the virtual camera controller sets the focus point of the virtual camera at the focus target point.

28. The storage medium according to claim 27, wherein the game program further causes the computer to function as distance calculator which calculates a distance from a position of the virtual camera to the focus target point in the virtual game space, and the virtual camera controller sets an angle of view of the virtual camera so that the angle of view is decreased as the distance calculated by the distance calculating means is longer.

29. The storage medium according to claim 28, wherein the virtual camera controller sets a vertical angle of an isosceles triangle as the angle of view of the virtual camera, the isosceles triangle having a base of a fixed length and a height being changed in proportion to the distance calculated by the distance calculator.

30. The storage medium according to claim 27, wherein of three coordinates for specifying a position of the focus target point, the focus target determining means determines two of the coordinates based on the coordinated detected by the coordinate detecting means and another one of the coordinates based on a predetermined rule.

31. The storage medium according to claim 27, wherein the virtual camera controller moves a position of the virtual camera in accordance with an operation performed by the player on the input unit or in an automatic manner, and
the second display controller generates the second image having displayed therein an area in a predetermined range on the two-dimensional map, which corresponds to an entirety of the virtual game space, with reference to a point corresponding to the position of the virtual camera.

32. The storage medium according to claim 27, wherein the second display controller generates the second image by rotating the two-dimensional map so that, on the second display unit, a direction connecting a point on the two-dimensional map corresponding to a position of the virtual camera and a point on the two-dimensional map corresponding to the focus target point is a predetermined direction on the second display unit.

33. The storage medium according to claim 27, wherein the second display controller generates the second image by zooming in or out of the two-dimensional map so that a distance on the second display unit between a point on the two-dimensional map corresponding to the focus target point and a point on the two-dimensional map corresponding to a position of the virtual camera is a predetermined distance.

34. The storage medium according to claim 27, wherein the game program further causes the computer to function as:
a photographic object controller which disposes a photographic object moving in the virtual game space with a predetermined algorithm;
evaluation target image storage locations which store the first image generated by the first display controller as an evaluation target image in accordance with a specific operation performed by the player on the input unit; and
an evaluating mechanism which evaluates the evaluation target image based on a state of disposition of the photographic object in the evaluation target image.

35. A method of selecting a focus target in a virtual game space comprising the steps of:
displaying, on a first display unit, a first image representing a scene captured by a virtual camera provided in the virtual game space;
storing feature information unique to each of a plurality of objects present in the virtual game space;
displaying, on a second display unit, an image which allows one or more images corresponding to the stored feature information to allow a player to specify a desired one of the plurality of objects as a desired focus target in a virtual game space;
directing the virtual camera to capture another scene in the virtual game space having the desired focus target, and
displaying on the first display unit a third image representing the another scene, wherein an image for distinguishing the focus target object from other objects is excluded in the first image.

36. The method of claim 35, further comprising the steps of:
storing feature information unique to each of a plurality of objects present in the virtual game space;
determining one of the plurality of objects as a focus target object;
displaying, on the second display unit, feature information corresponding to the focus target object; and
setting a focus point of the virtual camera at the focus target object.

37. The method of claim 36, further comprising the steps of:
selecting a piece of the feature information of the plurality of objects as selected feature information;
determining an object corresponding to the selected feature information as the focus target object; and
displaying, on the second display unit, an image for distinguishing the selected feature information from the other pieces of information.

38. The method of claim 36, further comprising the steps of:
displaying, on the second display unit, at least one command for changing between the plurality of objects;
selecting one of the at least one commands; and
changing the focus target object according to the selected command.

39. The method of claim 38, further comprising the steps of:
storing a state of the focus target object;
changing the state of the focus target object wherein whether a command is selectable depends on a current state of the focus target object; and
displaying an image, on the second display unit, allowing a player to ascertain which of the at least one commands is currently selectable.

40. The method of claim 36, further comprising the steps of:
storing a state of the focus target object;
changing the state of the focus target object; and
displaying an image, on the second display unit, including information indicative of a current state of the focus target object.

41. The method of claim 36, further comprising the steps of:
changing either one of a position of the virtual camera and a zoom scaling; and
setting a focus point of the virtual camera to the focus target object irrespective of the change.

42. The method of claim 35, wherein the virtual game space is a three-dimensional virtual game space, and the image displayed on the second unit includes a two dimensional map corresponding to the virtual game space, further comprising the steps of:
detecting coordinates on the two dimensional map indicative of a position specified by the player;
determining a point in the virtual game space corresponding to the position specified by the player on the two dimensional map as a focus target point; and
setting a focus point of the virtual camera at the focus target point.

43. The method of claim 42, further comprising the steps of:
calculating a distance from a position of the virtual camera to the focus target point in the virtual game space; and
setting an angle of view so that the angle of view is decreased as the calculated distance grows longer.

44. The method of claim 42, further comprising the step of:
setting a vertical angle of an isosceles triangle as the angle of view of the virtual camera, the isosceles triangle having a base of a fixed length and a height being changed in proportion to the calculated distance.

45. The method of claim 42, further comprising the step of:
  determining two of the three coordinates for specifying a position of the focus target point based on the detected coordinates and another one of the coordinates based on a predetermined rule.

46. The method of claim 42, further comprising the steps of:
  moving a position of the virtual camera in accordance with an operation performed by the player or in an automatic manner; and
  displaying, on the second display unit, an area in a predetermined range on the two-dimensional map, which corresponds to an entirety of the visible virtual game space, with reference to a point corresponding to the position of the virtual camera.

47. The method of claim 42, further comprising the step of:
  displaying the second image by rotating the two-dimensional map so that, on the second display unit, a direction connecting a point on the two-dimensional map corresponding to a position of the virtual camera and a point on the two-dimensional map corresponding to the focus target point is a predetermined direction on the second display unit.

48. The method of claim 42, further comprising the step of:
  displaying the second image by zooming in or out of the two-dimensional map so that a distance on the second display unit between a point on the two-dimensional map corresponding to the focus target point and a point on the two dimensional map corresponding to a position of the virtual camera is a predetermined distance.

* * * * *